(12) United States Patent
Mizumura

(10) Patent No.: US 7,092,027 B1
(45) Date of Patent: Aug. 15, 2006

(54) TV LENS SYSTEM AND APPARATUS AND METHOD FOR ZOOM CONTROL

(75) Inventor: Hiroshi Mizumura, Omiya (JP)

(73) Assignee: Fujinon Corporation, Saitama (JP)

( * ) Notice: Subject to any disclaimer, the term of this patent is extended or adjusted under 35 U.S.C. 154(b) by 672 days.

(21) Appl. No.: 09/630,390

(22) Filed: Aug. 1, 2000

(30) Foreign Application Priority Data

| Aug. 2, 1999 | (JP) | ................................. 11-218809 |
| Aug. 6, 1999 | (JP) | ................................. 11-224222 |
| Aug. 6, 1999 | (JP) | ................................. 11-224223 |

(51) Int. Cl.
 *H04N 5/232* (2006.01)
 *G03B 13/00* (2006.01)
(52) U.S. Cl. .......................... 348/345; 348/229; 396/77
(58) Field of Classification Search ................ 348/345, 348/347, 229, 211, 143; 396/77
See application file for complete search history.

(56) References Cited

U.S. PATENT DOCUMENTS

| 5,113,214 | A |   | 5/1992  | Nagata et al. |
| 5,434,621 | A |   | 7/1995  | Yu |
| 5,634,142 | A | * | 5/1997  | Imafuji et al. ................. 396/52 |
| 5,771,410 | A | * | 6/1998  | Sato et al. .................... 348/345 |
| 5,815,748 | A | * | 9/1998  | Hamamura et al. ......... 348/345 |
| 5,838,368 | A | * | 11/1998 | Masunaga et al. ........ 348/211.9 |
| 5,929,904 | A | * | 7/1999  | Uchida ..................... 348/211.7 |
| 6,134,390 | A | * | 10/2000 | Kasuya ......................... 396/77 |

FOREIGN PATENT DOCUMENTS

| EP | 0 869 381 A2 | 10/1998 |
| EP | 0 869 669 A2 | 10/1998 |
| JP | 08 334674 A | 12/1996 |
| JP | 08334674 A | 12/1996 |
| JP | 10 039193 A | 2/1998 |
| JP | 10039193 A | 2/1998 |
| JP | 10282396 A | 10/1998 |

* cited by examiner

*Primary Examiner*—Tuan Ho
*Assistant Examiner*—Gevell Selby
(74) *Attorney, Agent, or Firm*—Birch, Stewart, Kolasch & Birch, LLP

(57) ABSTRACT

A CPU of a lens system obtains contents of a speed control and a position control as a controller signal from a zoom controller. The speed control is based on an operation of a thumb ring which is instructed in a zoom controller, and the position control is based on a shot function or a limit function. These controls and a control based on a view angle correction function are executed by a process of the CPU, which follows a pre-set determination process; whereby, for example, an angle correction that was impossible to perform in a conventional art can be done after moving a zoom lens to a shot position based on the shot function. In a case that a rate control signal of the zoom lens that is provided from the zoom controller indicates stopping, the CPU fixes a position signal of the zoom lens that is outputted to the zoom controller to a position signal indicating a stopping position. In a case that a focus lens is moved by a focus controller, the zoom lens is moved to a position to prevent change of the view angle. Therefore, even if the zoom lens is stopped at the shot position, the zoom lens can be controlled based on the view angle correction function. Moreover, a limit position is detected in a predetermined direction and the view angle is corrected in consideration of the limit position; thus the zoom lens can be prevented from moving to the outside of the limit position by the view angle correction.

13 Claims, 11 Drawing Sheets

F I G. 1
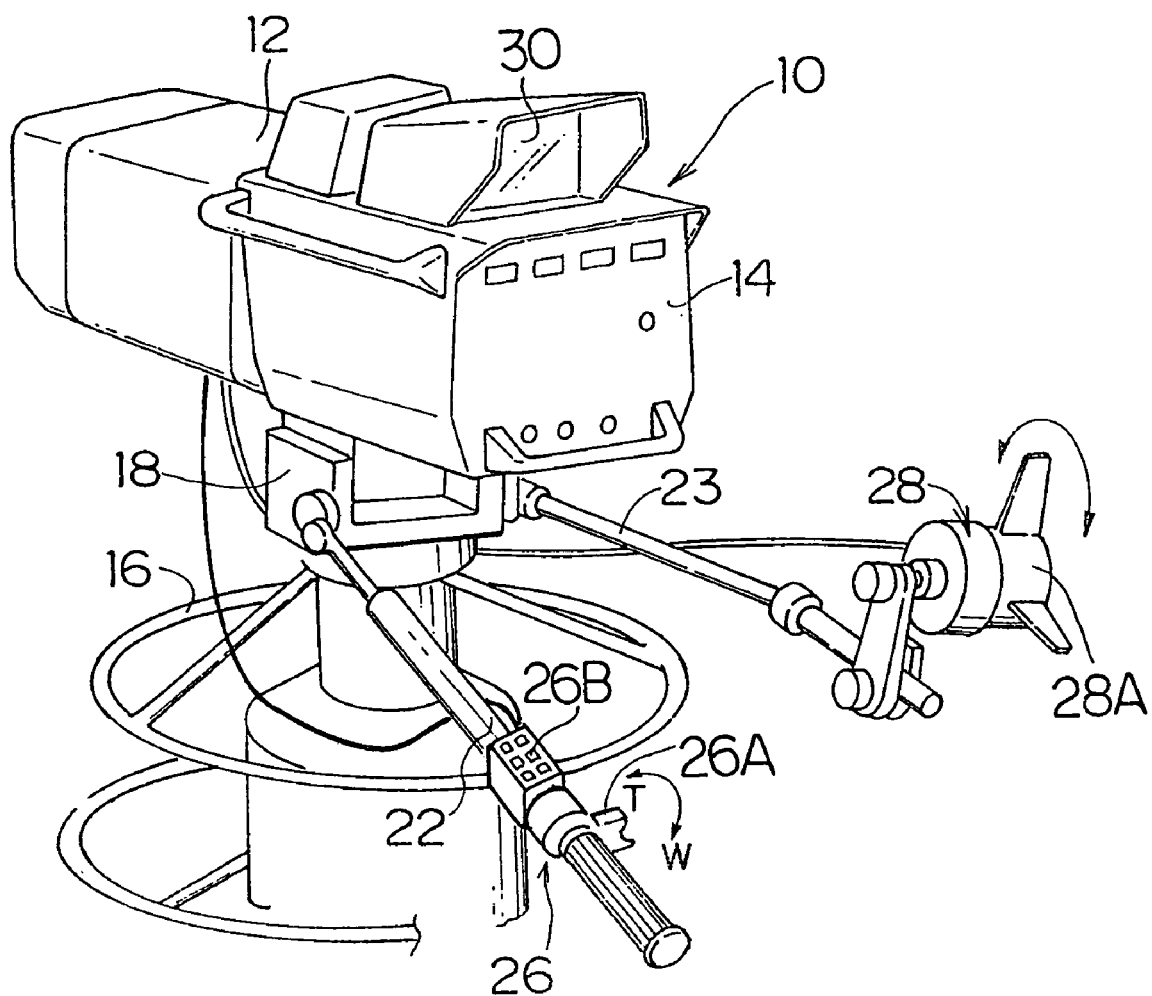

TV LENS SYSTEM AND APPARATUS AND METHOD FOR ZOOM CONTROL

BACKGROUND OF THE INVENTION

1. Field of the Invention

The present invention relates to a lens system and apparatus, particularly to a lens system in which zoom and focus of a lens apparatus that is mounted on a TV camera are controlled by a controller connected with the lens apparatus, and a lens apparatus having a view angle correction function to correct, by means of a zoom lens, change of a view angle at the time of focusing.

2. Description of Related Art

A lens apparatus to be mounted on a TV camera is connected with an external controller via a cable, and each optical member such as a zoom lens and a focus lens, which are arranged in the lens apparatus, is driven by a motor. In a lens system in which the lens apparatus is controlled with the external controller, the zoom lens is controlled in general by a rate control signal, which instructs a moving rate of the zoom lens. For example, a controller (a zoom controller) used for controlling the zoom lens is provided with a rotatable operation member called a thumb ring, and when the operator rotates the thumb ring, a rate control signal for instructing a zoom rate corresponding with an operation amount is transmitted to a control part of the lens apparatus, and the control part of the lens apparatus drives the zoom lens with the motor at the zoom rate that is instructed with the rate control signal.

A lens system is conventionally known that can control positions based on a shot function, a limit function or a view angle correction function, in addition to a function in a manual control in accordance with an operation of the operation member by the operator.

In the shot function, when a shot switch, which is provided to the zoom controller, is turned ON, the zoom lens moves to a shot position that is designated by a shot position adjusting knob. The shot function is conventionally controlled in the zoom controller (e.g. Japanese patent application Laid-open No. 8-334674). The zoom controller having the shot function is called a shot box. As the shot switch is turned ON, the zoom controller obtains a current position of the zoom lens from the lens apparatus, and transmits to the control part of the lens apparatus the rate control signal for instructing a moving rate in a moving direction so that a difference between the current position of the zoom lens and the designated shot position approaches zero, the moving rate corresponding with the difference. Thus, the control part of the lens apparatus drives the zoom lens in accordance with the rate control signal, and the zoom lens thereby moves to the shot position.

In the limit function, when a limit switch, which is provided to a controller, is turned ON, a moving range of the zoom lens is restricted within a range of a limit position. The limit function is conventionally controlled in the controller like the shot function (e.g. Japanese patent application Laid-open No. 10-39193). The current position of the zoom lens is obtained from the lens apparatus in the controller while the operation member of the controller is being operated, and when the current position of the zoom lens moves in a direction to approach the limit position, the rate control signal transmitted from the controller to the control part of the lens apparatus is restricted at a rate corresponding with the difference between the current position of the zoom lens and the limit position. If the current position of the zoom lens exceeds the limit position, the rate control signal for returning the zoom lens to the limit position is transmitted to the control part of the lens apparatus. Therefore, the control part of the lens apparatus restricts the moving range of the zoom lens to be within the limit position by driving the zoom lens in accordance with the rate control signal provided from the controller, without recognizing the limit position.

In the view angle correction function, the change of the view angle due to the moving of the focus lens is prevented by moving the zoom lens. The view angle correction function is conventionally controlled in the lens apparatus (e.g. Japanese patent application Laid-open No. 10-282396). The control part of the lens apparatus moves the zoom lens by its control at a position where the view angle is constant when moving the focus lens. When the focus lens moves in accordance with the control signal from the controller, the control part of the lens apparatus simultaneously drives the zoom lens and the focus lens so that the current position of the zoom lens and the zoom position which makes the view angle constant correspond with each other; thereby the change of the view angle at the focus adjustment is prevented.

In the conventional art, however, the lens apparatus cannot activate the view angle correction function in a case where the shot function and/or the limit function are executed. That is, when the control part of the lens apparatus moves the zoom lens by the control based on the view angle correction function while the zoom lens moves to and stops at the shot position or the limit position by the control based on the shot function or the limit function of the controller, the controller recognizes that the position of the zoom lens is displaced from the shot position, or, in some cases, recognized that the position of the zoom lens exceeded the limit position. Then, the controller transmits the rate control signal for returning the position of the zoom lens at the shot position or the limit position to the control part of the lens apparatus. The thus transmitted rate control signal cannot be determined by the control part of the lens apparatus whether the signal is based on the shot function or the limit function, or the operation of the operation member; moreover, the zoom lens must be controlled in accordance with the rate control signal because the control based on the operation of the operating member should take the first priority; thus the zoom lens is returned at the shot position after all, and the view angle correction function does not effectively function.

Similar problems occurs not only at the time of the shot function or the limit function, but also in a state where the zoom lens moves to and stops at a target position in the position control by some function of the position control in the controller.

In the limit function, it is usually not desired to perform the view angle correction up to the level where the zoom lens exceeds the limit position; however, in the shot function, it is more often desired to perform the view angle correction function first so as to correct the view angle from the shot position also, in a case where the zoom lens moves to and stops at the shot position.

In consideration of the above-described necessity, a method has been suggested in which the control signal provided from the zoom controller is invalidated while executing the view angle correction. Yet, this method also invalidates the restriction of the limit position originally provided from the zoom controller, and thus the zoom lens can move to the outside of the limit position by the view angle correction.

Further, even though it is considered preferable to prioritize the shot function or the limit function over the view angle correction function, the zoom lens does not move effectively at the proximity of the shot position or the limit position because of a control problem under a state where the plurality of controls based on the plurality of functions are simultaneously performed.

In the conventional art, the problem presented above occurs due to the fact that plural controls based on the shot function, the limit function, view angle correction function, and so forth, are executed by the control part of the lens apparatus and by the controller that are completely independent of each other.

SUMMARY OF THE INVENTION

Although the plurality of controls cannot be simultaneously executed when these controls are executed by one control part, at least a preferred control can be prioritized.

The present invention has been developed in view of the above-described circumstances, and has as its object the provision of a lens system which can prioritize a preferred control depending on a need when the controls based on the functions which are installed in the lens apparatus or the controller are instructed at the same time.

Another object of the present invention is to provide a lens system in which a zoom lens moves to a target position by a position control by a controller, and which can control the zoom lens based on a view angle correction function even if the zoom lens has stopped.

Yet another object of the present invention is to provide a lens system that can perform the view angle correction even if the zoom lens is stopped at a shot position by the control based on the shot function, and at the same time can prevent the zoom lens from moving to the outside of a limit position by the view angle correction when the limit function is being validated by the controller, and thus further can move the zoom lens in a preferred manner.

In order to achieve the above-described object, the present invention is directed to a lens system, comprising: a lens apparatus including a movable lens and a motor, one of a position and a moving rate of the movable lens being controlled with the motor; a controller connected with the lens apparatus; and a control part mounted in one of the lens apparatus and the controller, wherein the lens system executes a control of the movable lens based on one of a control function provided in the lens apparatus and a control function provided in the controller, wherein the control part obtains contents of a control of the movable lens based on the one of the control functions, and the control part executes the control of the movable lens based on the obtained contents of the control.

According to the present invention, the control function which the lens apparatus previously has or the control based on the function which is installed in the controller is executed by one control part. Thus, when plural controls are instructed simultaneously, a preferred control can be prioritized and executed depending on a need. In particular, the present invention easily overcomes the conventional problem occurred in controlling the zoom lens that the view angle correction cannot be performed because the zoom lens stops at the shot position when the zoom lens is moved to the shot position.

In a case where the zoom lens is at the shot position or the limit position after moving the zoom lens to the shot position by the control based on the shot function or after the moving the zoom lens to the limit position by the control based on the limit function, the control of the lens apparatus is the same as the control of the conventional lens apparatus.

Unlike the conventional art, in the present invention, the control based on the shot function or the limit function and the control based on the view angle correction function are not simultaneously executed. The control based on the view angle correction is not executed while the control based on the shot function or the limit function is executed, hence the present invention also solves the problem that the zoom lens does not effectively move to the proximity of the shot position and the limit position.

Further, in order to achieve the above-described object, the present invention is directed to a lens apparatus, comprising: a focus lens; a zoom lens; a controller; and a control part which executes a control for moving the zoom lens based on a control signal provided from the controller and executes a control based on a view angle correction function for moving the zoom lens to a position to prevent changing of a view angle due to moving of the focus lens, wherein the controller obtains, from the control part, a position signal representing a position of the zoom lens, wherein the control part obtains, from the controller, a control signal for moving the zoom lens to a target position set by the controller according to the position signal, wherein the control part comprises a position signal fixing device which fixes, when executing the control based on the view angle correction function, a value of the position signal outputted from the control part to the controller to a value representing a position of the zoom lens before executing the control based on the view angle correction function.

According to the present invention, the value of the position signal of the zoom lens provided to the controller from the lens apparatus is fixed at a value indicating the target value for the zoom lens which stops at the predetermined target position by the position control of the controller even in a case where the control based on the view angle correction function is executed in the lens apparatus. Thus a state does not occur in which the control signal for instructing moving the zoom lens (the control signal for instructing returning to the target position) is provided from the controller to the lens apparatus due to moving of the zoom lens by the view angle correction function. Therefore, the control part of the lens apparatus can correct the view angle even if the zoom lens is stopped at the target position by the position control by the controller.

Furthermore, in order to achieve the above-described object, the present invention is directed to a lens apparatus, comprising: a focus lens; a zoom lens; a controller; and a control part which executes a control for moving the zoom lens based on a control signal provided from the controller and executes a control based on a view angle correction function for moving the zoom lens to a position to prevent changing of a view angle due to moving of the focus lens, wherein the controller has a limit function for obtaining, from the control part, a position signal representing a position of the zoom lens and for restricting a moving range of the zoom lens so that the zoom lens does not move to an outside of a predetermined limit position based on the position signal, wherein the control part comprises: a limit position determining device which determines the limit position by changing a value of the position signal being outputted from the control part to the controller from a value representing an actual position of the zoom lens and detecting a change of the control signal outputted from the controller with respect to the changed value of the position signal; and a restricting device which restricts a moving range of the zoom lens so that the zoom lens does not move to an outside of the limit position determined by the limit position determining device.

According to the present invention, the value of the position signal outputted from the lens apparatus to the controller is fixed, whereby the view angle can be corrected with respect to the zoom lens which is stopped at the shot position by the control of the shot function. By fixing the value of the position signal as described above, the zoom lens might move over the limit position by the view angle correction; however, the limit position is detected by a predetermined means and the zoom lens is controlled at the lens apparatus side so as not to exceed the limit position, whereby the zoom lens is prevented from moving to the outside of the limit position.

Furthermore, the present invention also overcome the problem in the conventional art in that because the position signal is fixed and the shot function and the limit function are substantially invalidated, the shot function or the limit function and the view angle correction function are simultaneously performed in a case where a control based on the view angle correction function is executed with respect to the zoom lens which is stopped at the shot position or the limit position by the shot function or the limit function, respectively. Therefore, the present invention can move the zoom lens effectively even at the proximity of the shot position or the limit position.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view showing the TV camera to which a lens system of an embodiment of the present invention is used;

DETAILED DESCRIPTION OF THE PREFERRED EMBODIMENT

Figure 2:
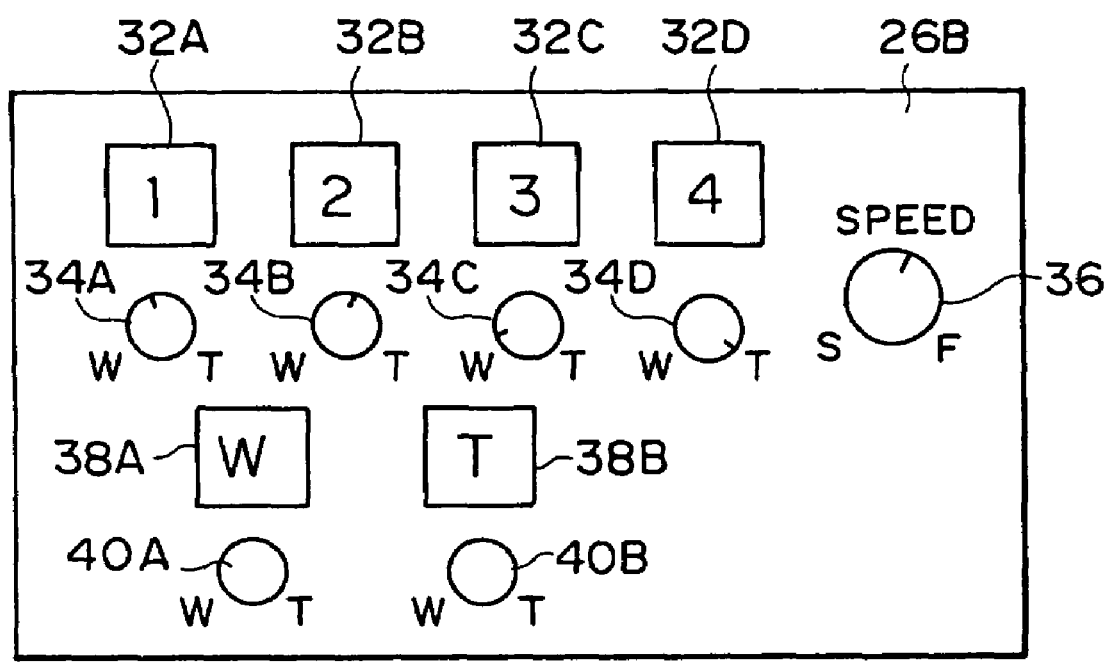
FIG. 2 is a view showing a construction of an operation member which is arranged on a switch panel of a zoom controller.

Hereunder preferred embodiments of a lens system of the present invention will be described in detail in accordance with the accompanying drawings.

FIG. 1 is a perspective view showing an example of a TV camera to which a lens system according to embodiments of the present invention is used. As shown in FIG. 1, a TV camera 10 is constructed of a lens apparatus 12 and a camera body 14, on which a viewfinder 30 for checking a picture during shooting. The TV camera 10 is supported on a pedestaldolly 16 through a pan head 18, to which two operation rods 22 and 23 are provided. A zoom controller 26 for operating a zoom rate and the like and a focus controller 28 for focus operation are attached to the ends of the operation rods 22 and 23, respectively.

The zoom controller 26 is also called as a shot box and is provided with a thumb ring 26A and a switch panel 26B. The thumb ring 26A can be rotated in both directions from a reference position (a neutral position). The operator rotates the thumb ring 26A with his/her left hand's thumb so as to adjust a rotation amount and a rotation direction whereby a moving rate and a moving direction of a zoom lens mounted in the lens apparatus 12 can be operated. A rate control signal and the like corresponding with the rotation amount and the rotation direction of the thumb ring 26A is outputted from the zoom controller 26 to the lens apparatus 12.

The switch panel 26B is provided to execute a shot function and a limit function. The shot function automatically moves the zoom lens to a desired position (shot position) by pressing the switch down, and the limit function restricts a moving range of the zoom lens within a desired position at a widephoto side and a telephoto side. As shown in FIG. 2, the switch panel 26B is provided, in relation to the shot function, with shot switches 32A, 32B, 32C and 32D for instructing shot execution by the press-down operation of the operator. Corresponding with the switches 32A–32D, shot position adjustment knobs 34A, 34B, 34C and 34D are provided for setting shot positions, respectively. A rate adjustment knob 36 is also provided for setting a moving rate of the zoom lens toward the shot position at the shot execution.

In relation to the limit function, the switch panel 26B is provided with limit switches 38A and 38B for switching validation and invalidation of the limit function with respect to each of the widephoto side and the telephoto side by the press-down operation of the operator. Corresponding with the limit switches 38A and 38B, limit position adjustment knobs 40A and 40B are provided for setting the limit positions of the widephoto side and the telephoto side, respectively. The control of the zoom based on these functions will be described later.

A rotatable focus ring 28A is provided to the focus controller 28 in FIG. 1. The operator rotates the focus ring 28A with his/her right hand so as to adjust the rotation position, whereby the position of the focus lens mounted in the lens apparatus 12 can be operated. The focus controller 28 transmits a position control signal and the like to the lens apparatus 12 corresponding with the rotation position of the focus ring 28A.

Figure 3:
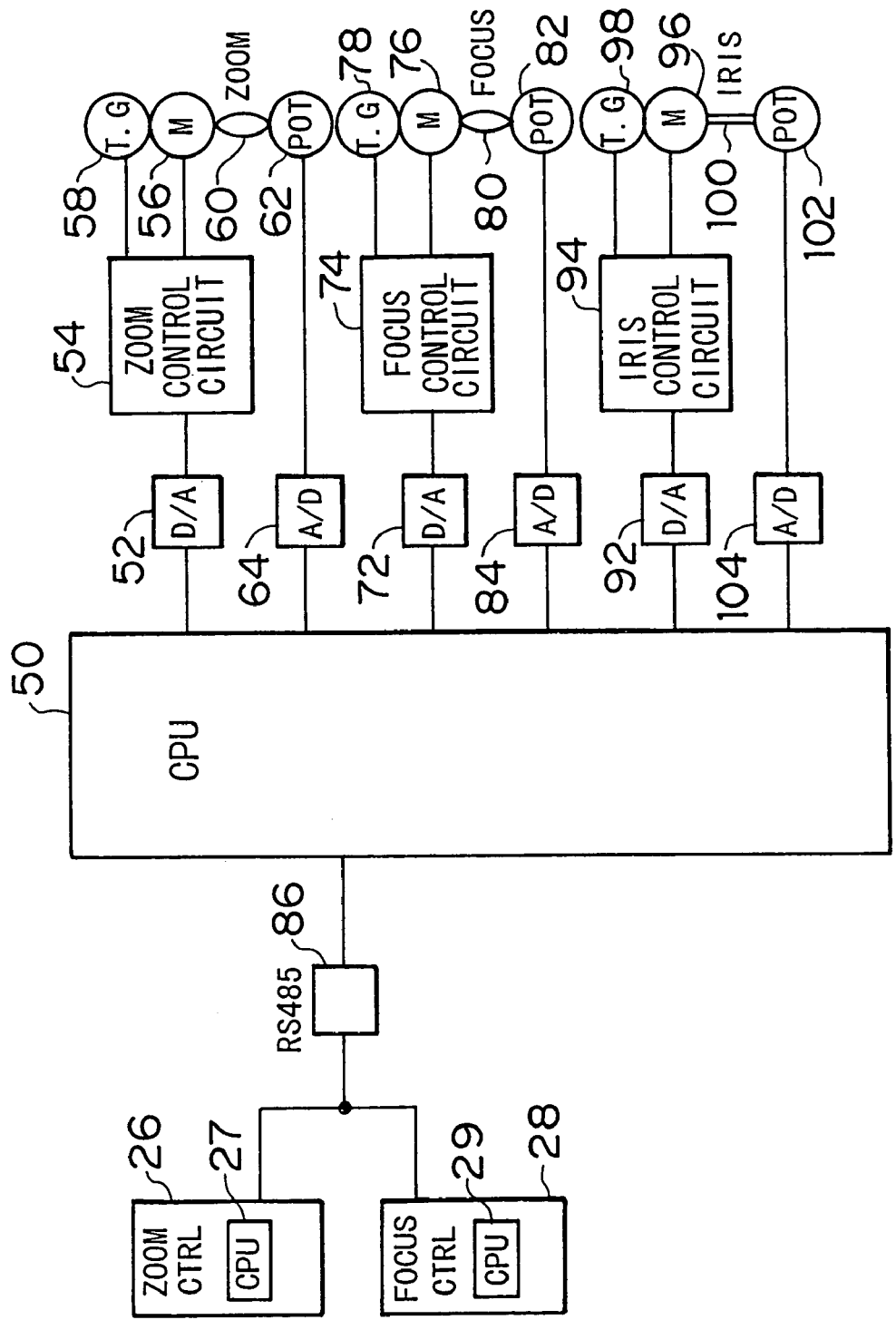
FIG. 3 is a block diagram showing the lens system of the first embodiment of the present invention.

FIG. 3 is a block diagram showing the construction of the lens system according to the first embodiment of the present invention. As shown in FIG. 3, the lens apparatus 12 has a CPU 50 for processing all sorts of controls with respect to a zoom lens 60, a focus lens 80 and an iris 100. When the zoom controller 26 and the focus controller 28 are connected with predetermined connectors of the lens apparatus 12, the CPU 50 obtains from controllers 26 and 28 respective types of information (controller information) through a serial communication via an RS485 interface 86, and controls the zoom lens 60, the focus lens 80 and the iris 100 based on the controller information and so forth.

The control of the zoom lens 60 will be described. Controls of the zoom lens 60 are a rate control based on an operation of the thumb ring 26A of the zoom controller 26 (a control based on a manual control function), a position control based on the shot function or the limit function, which are instructed on the switch panel 26B of the zoom controller 26, or a position control based on the view angle correction function, which is provided in the lens apparatus 12.

The rate control based on the operation of the thumb ring 26A of the zoom controller 26 is performed by moving the zoom lens 60 at a rate corresponding with the operation amount when the operator operates the thumb ring 26A of the zoom controller 26. As shown in FIG. 3, the operation amount of the thumb ring 26A is determined by the CPU 27 in the zoom controller 26, and the rate control signal for instructing the moving rate (zoom rate) of the zoom lens 60 corresponding with the determined operation amount is transmitted from the CPU 27 to the CPU 50 via the RS485 interface 86. The rate control signal may be transmitted continuously, or may be transmitted only when the amount of the operation of the thumb ring 26A changes.

When the CPU 50 obtains the rate control signal from the zoom controller 26, the CPU 50 outputs the control signal for instructing a rotation speed (the moving rate of the zoom lens 60) of a zoom drive motor 56 in accordance with the rate control signal to a zoom control circuit 54 through a D/A converter 52 converting the control signal into an analog signal.

As the control signal is provided from the CPU 50 to the zoom control circuit 54 as described above, the zoom control circuit 54 obtains an actual rotation speed of the zoom drive motor 56 from a tachogenerator 58. The zoom control circuit 54 then applies voltage to the zoom drive motor 56 so that a difference between the rotation speed of the zoom drive motor 56 that is instructed by the control signal from the CPU 50 and the actual rotation speed of the zoom drive motor 56 is zero. Thereby, the zoom drive motor 56 rotates in the rotation speed that is instructed from the CPU 50, and the zoom lens 60 moves at the rate that is instructed through the thumb ring 26A of the zoom controller 26.

If the operation of the thumb ring 26A is not at the neutral position (central position), that is, if the thumb ring 26A is being operated, the CPU 50 prioritize the rate control in accordance with the operation of the thumb ring 26A with respect to the shot function and the view angle correction function, but not with respect to the limit function. Thus, if the limit function is being validated, moving of the zoom lens 60 to exceed the limit position is prevented regardless of the operation of the thumb ring 26A.

In the position control based on the shot function, which is instructed in the switch panel 26B of the zoom controller 26 in FIG. 2, when one of the shot switches 32A–32D arranged on the switch panel 26B of the zoom controller 26 is pressed down, the zoom lens 60 is moved to and stopped at the shot position that is set by one of the shot position adjustment knobs 34A–34D corresponding with the pressed one of the shot switches 32A–32D. A speed of the zoom lens 60 when moving to the shot position is set by the rate adjustment knob 36 provided on the switch panel 26B. States of the shot switches 32A–32D, the shot position adjustment knobs 34A–34D and the speed adjustment knob 36 are determined by the CPU 27 of the zoom controller 26, and the states are transmitted to the CPU 50 as switch information, shot position information and speed information, respectively, via the RS485 interface 86. In short, the contents of the controls based on the shot function are transmitted to the CPU 50 as the switch information, the shot information and the speed information. The information may be transmitted only when at least one of the states changes, or may be transmitted continuously.

When determining, with the switch information obtained as described above, that one of the shot switches 32A–32D is pressed, the CPU 50 obtains a set position of one of the shot position adjustment knobs 34A–34D corresponding with the pressed shot switch from the shot position information, and sets a target position to move the zoom lens 60 based on the set position. The CPU 50 obtains a current position of the zoom lens 60 from a potentiometer 62 via an A/D converter 64, and finds the difference between the target position and the current position of the zoom lens 60, then outputs to the D/A converter 52 the control signal for instructing the rate in a direction so that the difference approaches zero, the rate corresponding with the difference, and after that provides the control signal to the zoom control circuit 54 through he D/A converter 52 converting the control signal to the analog signal.

In a case to instruct the rate to the zoom control circuit 54 by the control signal, the CPU 50 determines the rate that is set by the speed adjustment knob 36 of the switch panel 26B in accordance with the speed information obtained from the zoom controller 26, and restricts the rate to be instructed to the zoom control circuit 54 not to exceed the rate that is set by the speed adjustment knob 36.

Thus, by a process similar with the process of the zoom control circuit 54, the zoom lens moves to and stops at the shot position.

When the thumb ring 26A of the zoom controller 26 is at the neutral position, the CPU 50 prioritizes the position control based on the shot function with respect to the control based on the operation of the thumb ring 26A. The CPU 50 basically prioritizes the position control based on the shot function with respect to the control based on the view angle correction function; however, the control based on the view angle correcting function is prioritized in a state where the zoom lens is moved to and stopped at the shot position. More specifically, when moving the focus lens 80 by the instruction of the focus controller 28 where the zoom lens 60 is stopped at the shot position by the shot execution, the zoom lens is moved by the control based on the view angle correction function at a position to make the view angle constant. This feature for correcting the view angle while the zoom lens is stopped at the shot position is a control that was not possible by a conventional lens system.

On the other hand, the control based on the shot function is not prioritized with respect to the control based on the limit function. When the shot position is at the outside of the limit position, the zoom lens 60 is stopped at the limit position.

In a case of the position control based on the limit function, which is instructed in the switch panel 26B of the zoom controller 26 shown in FIG. 2, when the limit switch 38A and the limit switch 38B, which are provided on the switch panel 26B of the zoom controller 26, are turned ON, the limit function with respect to the widephoto side and the telephoto side becomes validated, and the limit positions of the widephoto side and the telephoto side are set by the limit position adjustment knob 40A and the limit position adjustment knob 40B, which are provided corresponding with the limit switch 38A and the limit switch 38B, respectively. The states of the limit switches 38A and 38B and the limit position adjustment knobs 40A and 40B are determined by the CPU 27 of the zoom controller 26, and are transmitted to the CPU 50 via the RS485 interface 85 as the switch information and the limit position information, respectively. In short, the contents of the control based on the limit function are transmitted to the CPU 50 as the switch information and the limit position information. The information may be transmitted only when at least one of the states change, or may be transmitted continuously.

When determining, with the switch information, that at least one of the limit switches 38A and 38B is turned ON, the CPU 50 obtains a setting position of one of the limit position adjustment knobs 40A and 40B corresponding with the limit switch that is turned ON, and sets the limit position of the corresponding one of the widephoto side and the telephoto side. If at least one of the limit switches 38A and 38B is turned OFF, the limit position of the side that is OFF is set at the corresponding one of the widephoto end and the telephoto end (the widephoto end and the telephoto end are mechanical ends). The CPU 50 then determines the limit position in the moving direction as a target position while the zoom lens 60 is being moved based on the operation of the thumb ring 26A, the shot function, or the view angle correction function. After the target position is thus determined, the CPU 50 obtains the current position of the zoom lens 60, which is being moved by the control based on the operations such as of the thumb ring 26A, from the potentiometer 62 via the A/D converter 64, and finds the difference between the target position, which is determined as described above, and the current position. Then, when the difference is smaller than a predetermined value (that is, when the position of the zoom lens approaches the limit position within a predetermined distance), the CPU 50 reduces an instructing speed of the control signal provided to the zoom control circuit 54 so that the speed corresponds with the difference. Thereby, the moving rate of the zoom lens 60 decreases at the proximity of the limit position regardless of the operation of the thumb ring 26, and the zoom lens 60 is stopped at a position within the limit position. In the same manner as the position control based on the shot function, the CPU 50 executes a control for moving the zoom lens 60 at the limit position when the zoom lens 60 is at the outside of the limit position (i.e., the zoom lens 60 is at a more widephoto side than the limit position of the widephoto side, or at a more telephoto side than the limit position of the telephoto side).

The CPU 50 prioritizes position controls based on the limit function with respect to all other controls while the limit function is being validated. More specifically, the zoom lens 60 never exists at a position over the limit position, and the zoom lens 60 moves to and stops at the limit position if the zoom lens exists at the outside of the limit position when the limit function becomes validated.

The position control based on the view angle correction function is, for example, a control that is switched between valid and invalid by a predetermined switch, which is provided to the lens apparatus 12 and so forth; if the view angle correction function is validated, the CPU 50 executes the position control. At this moment, the CPU 50 obtains the positions of the zoom lens 60 and the focus lens 80 from the potentiometers 62 and 82 via the A/D converters 64 and 84. When the focus lens 80 is moved in accordance with the instruction from the focus controller 28, which will be described later, the CPU 50 determines, as the target position, a position of the zoom lens 60 that makes the photographing view angle constant with respect to the moved position of the focus lens 80. The position of the zoom lens 60 that makes the photographing view angle constant is stored beforehand in a predetermined memory as numerical data in order to be found, or is stored as a numerical formula to be calculated, with respect to the positions of the focus lens 80 before and after moving and the position of the zoom lens 60 before moving. As the target position is determined as described above, the CPU 50 finds the difference between the target position and the current position of the zoom lens 60, and outputs the control signal for instructing a rate corresponding with the difference in a direction so that the difference approaches zero, to the zoom control circuit 54 through the D/A converter 52 converting the control signal in the analog signal. Thus, the zoom lens 60 is moved by the control of the zoom control circuit 54 to the position for preventing the change of the view angle due to moving of the focus lens 80.

When the zoom lens 60 is stopping such as in a case where the zoom lens 60 moves to the shot position after the shot execution, or when the thumb ring 26A of the zoom controller 26 is at the neutral position, the CPU 50 basically prioritizes the position control based on the view angle correction function with respect to the other controls. The CPU 50, however, does not control the view angle correction for moving the zoom lens 60 over the limit position.

When executing the position control based on the view angle correction function, the position signal that is outputted from the CPU 50 to the zoom controller 26 to indicate the position of the zoom lens 60 is fixed at the position of the zoom lens 60 before the position control based on the view angle correction function is executed. By this process, the view angle correction function is effectively executed in which no rate control signal is provided from the zoom controller 26 to the CPU 50 for returning the zoom lens 60 to the shot position even though the zoom lens 60 is moved with the view angle correction function by the CPU 50 in the state where the zoom controller 26 stops the zoom lens 60 at the shot position by the position control based on the shot function.

The control on the focus will be described. The focus is controlled in accordance with the operations of the focus ring 28A of the focus controller 28 in FIG. 1. The operation of the focus ring 28A is detected by the CPU 29 of the focus controller 28, and the position control signal for instructing moving the focus lens 80 to the focus position corresponding with the operation position is transmitted from the CPU 29 to the CPU 50 via the RS485 interface 86.

When obtaining the position control signal from the focus controller 28, the CPU 50 determines the focus position which is instructed by the position control signal as the target position. The CPU 50 also obtains the current position of the focus lens 80 from the potentiometer 82 via the A/D converter 84. Then, the CPU 50 outputs the control signal for instructing a rate in the direction so that the difference between the target position and the current position of the focus lens 80 approaches zero, the rate corresponding with the difference, to a focus control circuit 74 through a D/A converter 72 converting the control signal into an analog.

When obtaining the control signal outputted from the CPU 50 as described above, the focus control circuit 74 obtains the actual rotation speed of a focus drive motor 76 from a tachogenerator 78. The focus control circuit 74 then applies voltage to the focus drive motor 76 so that the difference between the rotation speed of the focus drive motor 76 that is instructed by the control signal from the CPU 50 and the actual rotation rate of the focus drive motor 76 approaches zero. Thereby, the focus drive motor 76 rotates in the rotation speed that is instructed from the CPU 50, and the focus lens 80 moves to the focus position that is instructed by the focus controller 28.

The control of the iris is hereunder described. When the CPU 50 receives the position control signal indicating the position of the iris 100 (a diameter of the iris) from the camera body 14 (the position control signal of the iris 100 is sometimes provided from a controller such as the zoom controller 26 and the focus controller 28), the CPU 50 determines the position indicated by the position control signal as the target position, and obtains the current position of the iris 100 (the diameter of the iris) from a potentiometer 102 via an A/D converter 104. The CPU 50 then finds a difference between the target position and the current position of the iris 100, and outputs a control signal for instructing a rate corresponding with the difference in a direction so that the difference approaches zero, to an iris control circuit 94 through a D/A converter 92 converting the control signal into an analog signal.

When the iris control circuit 94 obtains the control signal that is outputted from the CPU 50 as described above, the iris control circuit 94 obtains an actual rotation speed of an iris drive motor 96 from a tachogenerator 98. The iris control circuit 94 then applies voltage to the iris drive motor 96 so that the difference between the rotation speed of the iris drive motor 96 that is instructed by the control signal from the CPU 50 and the actual rotation speed of the iris drive motor 96 approaches zero. Thereby, the iris drive motor 96 rotates in the rotation speed that is instructed from the CPU 50, and the diameter of the iris 100 is changed.

Figure 4:
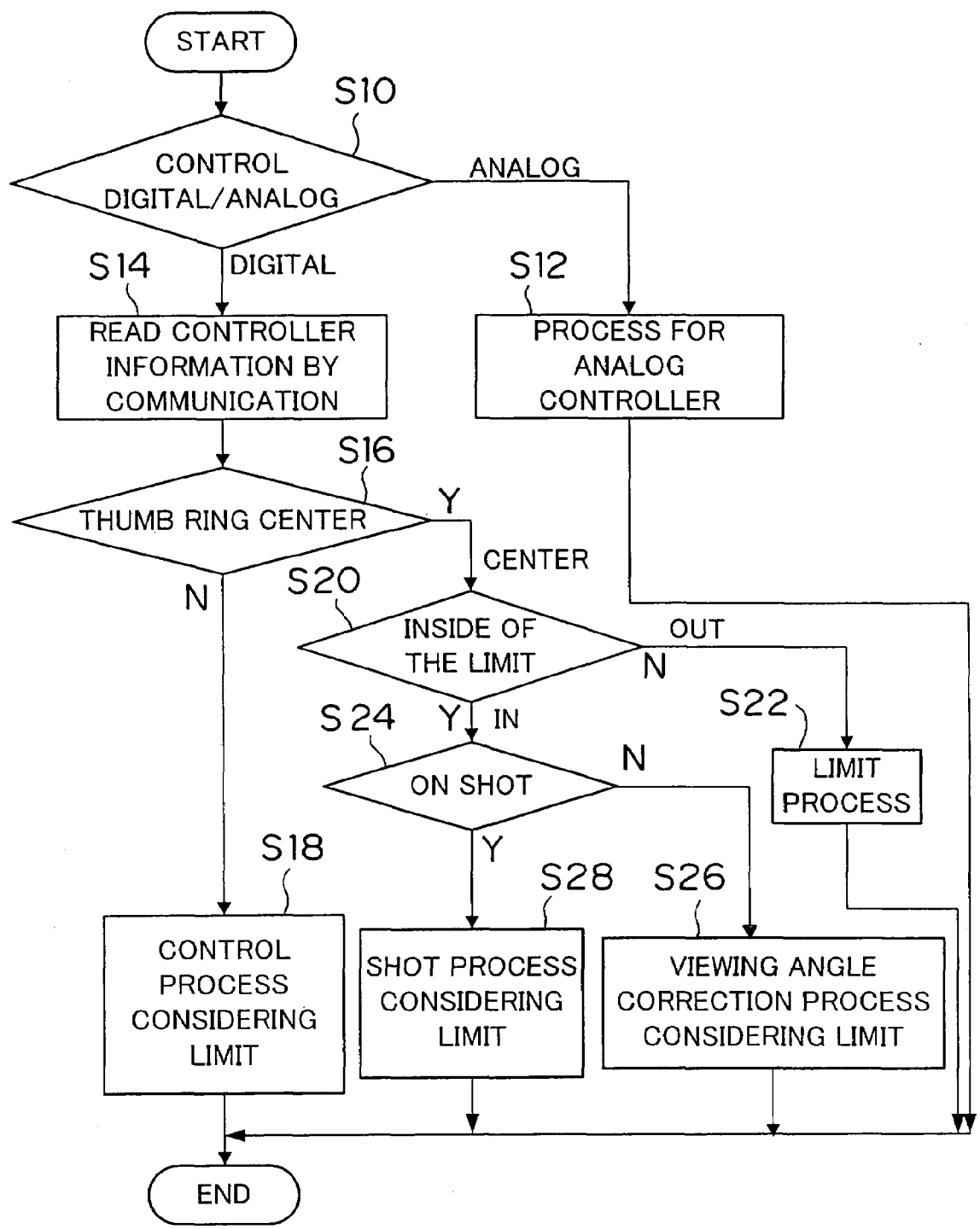
FIG. 4 is a flowchart showing a procedure related to a control of a zoom in the first embodiment of the present invention.

A procedure related to the control of the zoom in the CPU 50 is described referring to a flowchart in FIG. 4. The CPU 50 first determines whether the zoom controller 26 is in the digital form or analog form (step S10). As shown in FIG. 3, a digital zoom controller transmits respective types of information such as the rate control signal to the CPU 50 by serial communication of the digital signal. On the other hand, an analog zoom controller sends an instruction such as the zoom rate by a voltage value of an analog voltage signal. The CPU 50 transmits a predetermined command to the zoom controller 26, and determines the zoom controller as the analog zoom controller if a response is received, and determines the zoom controller as the digital zoom controller if no response is received. When the CPU 50 detects the analog controller, it performs a process for the analog zoom controller (step S12), which is not described here.

On the other hand, if the CPU 50 detects the digital zoom controller, the CPU 50 reads controller information from the zoom controller 26 by a communication (step S14). As mentioned before, the controller information comprises the rate control signal (rate control signal information) based on the thumb ring 26A, the switch information indicating a state of the shot switches 32A–32D and the limit switches 38A and 38B on the switch panel 26B, the shot position information indicating a set position of the shot position adjustment knobs 34A–34D, the limit position information indicating a set position of the limit position adjustment knobs 40A and 40B, and the speed information indicating a set position of the speed adjustment knob 36.

After the reading, the CPU 50 determines whether or not the thumb ring 26A is at the neutral position (the central position) from the rate control signal which is obtained by the controller information (step S16). At this point, if the CPU 50 determines the answer NO, that is, the thumb ring 26A is determined to be operated, the CPU 50 controls the rate of the zoom lens 60 based on the operation of the thumb ring 26A by considering the limit position (step S18). In other words, when the limit function is determined to be valid from the switch information, the CPU 50 sets the limit position by the limit position information; when the limit function is determined to be invalid from the switch information, the CPU sets a mechanical end at the limit position, and moves the zoom lens 60 in accordance with the operation of the thumb ring 26A so that the zoom lens 60 does not exceed the limit position.

On the other hand, if the thumb ring 26A is determined to be at the center at step S16, the CPU 50 next determines whether or not the position of the zoom lens 60 is at the inside (step S20). If the determination is NO, the limit process is performed (step S22). In other words, if the zoom lens 60 is at the outside of the limit position, the zoom lens 60 is moved to and stopped at the limit position.

If the determination at step S20 is YES, that is, if the zoom lens 60 is determined to be at the inside of the limit position, the CPU 50 determines whether or not the zoom lens 60 is in a shot period (step S24). The shot period is while the zoom lens 60 moves to and stops at the shot position after one of the shot switches 32A–32D is turned ON. If the determination is NO, it means that the zoom lens 60 is stopping; thus the CPU 50 performs the view angle correction process by considering the limit position when the focus lens 80 is moved (step S26). In other words, the zoom lens 60 is moved to a position to make the photographing view angle constant within a range where the zoom lens 60 does not exceed the limit position (step S24).

If the determination at step S24 is YES, a shot process is performed by considering the limit position (step S28). That is, the zoom lens 60 is moved to the shot position within the range where the zoom lens does not exceed the limit position.

According to the above-described process, the control based on the limit function is firstly prioritized; if the thumb ring 26A is operated, the control in accordance with the thumb ring 26A is prioritized with respect to the shot function and the view angle correction function. In a case where the thumb ring 26A is not operated, the shot function is basically prioritized with respect to the view angle correction function; if the zoom lens 60 moves to and stops at the shot position by the shot function, the control based on the view angle correction function is accepted.

In the above-described process, the control based on the view angle correction function is accepted when the zoom lens 60 moves to and stops at the shot position by the shot function; however, the control based on the view angle correction function can be prohibited while the zoom lens 60 moves to and stops at the shot position. In other words, the control based on the shot function may always be prioritized with respect to the control based on the view angle correction function, and the zoom lens 60 may be set not to move from the shot position while the zoom lens 60 is stopping at the shot position by the shot function although the view angle is changed by moving the focus lens 80.

Since the lens apparatus 12 processes the control based on the respective function loaded in the lens apparatus 12 or the zoom controller 26 in the CPU 50 of the lens apparatus 12, the order of priority of the respective controls is not limited to the one presented at the above process; the respective controls may easily be performed by any other orders of priority.

In the first embodiment of the present invention, the CPU 50 in the lens apparatus 12 obtains by the controller information the contents of the operation of the thumb ring 26A which is instructed in the zoom controller 26, and the contents of the control based on the shot function and the limit function, and executes an appropriate control in accordance with the determination process in FIG. 4 if those controls and the control based on the view angle correction function are instructed at the same time. However, the same process as the CPU may be performed by the CPU 27 in the zoom controller 26. In such case, the CPU 27 obtains the contents of the control based on the view angle correction function from the lens apparatus 12.

Moreover, in the first embodiment, the case is described in which one controller (the zoom controller 26) is connected with the lens apparatus 12 in relation to the control of the zoom; however, similar with the first embodiment, when the plural controllers are connected in relation to the control of the zoom, a single control part (CPU) which is installed in the lens apparatus or in one of the controllers obtains the contents of the control based on the respective function installed in the lens apparatus or in one of the controllers and executes the control based on the respective functions; thereby, the control suited with the situation can be executed even in a case where the plural controls are instructed at the same time by the lens apparatus and the respective controllers like the case of the first embodiment.

In the first embodiment, the case is described in which the function of the manual control based on the operation of the thumb ring 26A of the zoom controller 26, the shot function, and the limit function are loaded, and the view angle correction function is installed in the lens apparatus 12. However, the present invention can be applied not only to these functions but also to functions which are installed and are different from these functions.

A certain function is installed in the zoom controller 26 in the first embodiment which is connected with the lens apparatus 12. However, the lens apparatus which was most recently used can execute controls of respective lenses and iris in a computer by connecting the computer with the lens apparatus 12. Respective functions related to the lens control can be easily added and changed later in the computer, and a process in consideration with the order of priority among respective functions as shown in FIG. 4 can be easily changed as well; thus it is preferable to make the computer obtain the contents of the control based on the respective functions loaded in the lens apparatus 12 or another controller and execute the lens control.

The control of the zoom has been described in the first embodiment; however, the present invention can also be applied to the control of other optical members such as focus, iris, and extender. For example, if the shot function which is similar with the function of the manual focus by the focus ring 28A is installed whereas the auto focus function for focusing after the manual focus by the focus controller with a high precision is installed, the control can be easily achieved by the present invention in which the auto focus is executed after the manual focus but the auto focus is not activated after the focus lens 80 moves to the shot position by the execution of the shot function.

The controller is described which is connected with the lens apparatus 12 and has a function to perform a digital serial communication in the first embodiment; however the present invention can also be applied in the same manner to a controller which transmits an analog signal.

Figure 5:
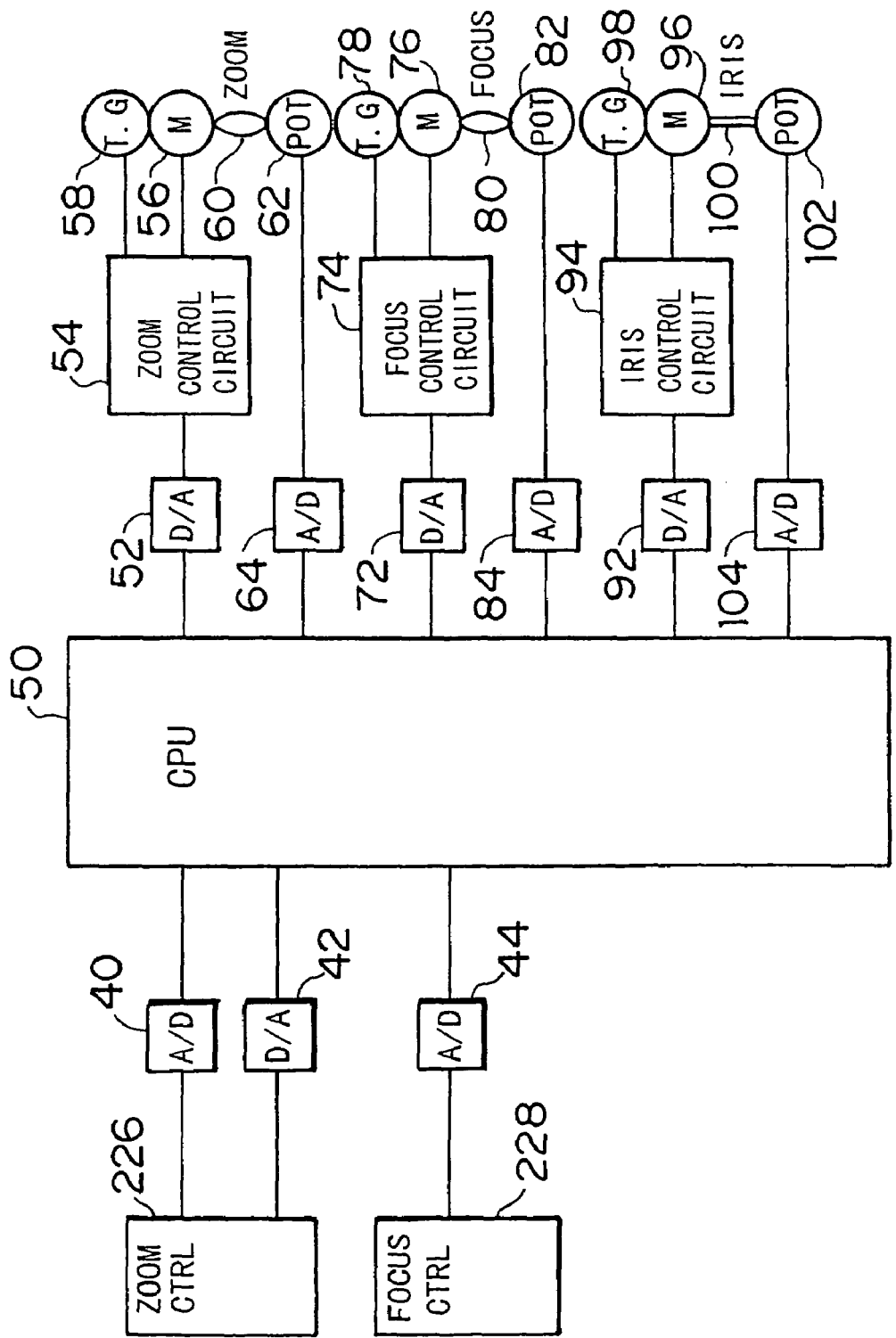
FIG. 5 is a block diagram showing the lens system of the second embodiment of the present invention.

Hereunder the second embodiment of the present invention will be described. The members which are the same or similar with the ones in the first embodiment are assigned the same or similar reference numbers, and the description for them is omitted. FIG. 5 is a block diagram showing a construction of the lens system of the second embodiment.

In the rate control in accordance with the operation of the thumb ring 26A of the zoom controller 26, an operation amount of the thumb ring 26A is detected by the potentiometer in a zoom controller 226. The operation amount is outputted from the zoom controller 226 as the rate control signal for instructing a moving rate (zoom rate) of the zoom lens 60 by the analog signal. Then the rate control signal is converted into a digital signal by the A/D converter 40 and is inputted to the CPU 50.

In the position control based on the shot function instructed on a switch panel 26B of the zoom controller 226, when one of the shot switches 32A–32D is pressed, the zoom controller 226 detects the shot position which is set by the shot position adjustment knobs 34A–34D corresponding with the pressed shot switches 32A–32D, and obtains via the D/A converter 42 the current position of the zoom lens 60 from the CPU 50 of the lens apparatus 12.

The zoom controller 226 outputs to the lens apparatus 12 the rate control signal for instructing a rate in a direction where the difference between the current position of the zoom lens 60 and the shot position which are obtained from the CPU 50 is zero, the rate corresponding with the difference, by switching the rate control signal into the rate control signal in accordance with the operation of the thumb ring 26A. The rate control signal is converted into a digital signal by the A/D converter 40, and is inputted to the CPU 50.

As obtaining the rate control signal from the zoom controller 226, the CPU 50 outputs to the zoom control circuit 54 the control signal for instructing the rotation speed (the moving rate of the zoom lens 60) of the zoom drive motor 56 in accordance with the rate control signal similar with the rate control in accordance with the operation of the thumb ring 26A. By this process, the zoom drive motor 56 is driven, and the zoom lens 60 moves at the rate which is instructed by the rate control signal from the zoom controller 226. Moreover, since the zoom controller 26 outputs the rate control signal so that the zoom lens 60 stops at the shot position, the zoom lens 60 moves to and stops at the shot position.

In the position control based on the view angle correction function, the CPU 50 moves the zoom lens 60 in accordance with the rate control signal from the zoom controller 226, and obtains the position of the zoom lens 60 and the position of the focus lens 80 from the potentiometer 62 and 82, respectively, via the A/D converter 64 and 84 when the zoom lens 60 is stopped by the instruction of the rate control signal to stop (zero), then stores the positions of the respective zoom lens 60 and the focus lens 80.

After that, as described below, if the focus lens 80 is moved in accordance with the instruction from the focus controller 228 (or in accordance with the auto focus signal transmitted from the camera 14), the position of the zoom lens 60 which makes the photographing view angle constant with respect to the moved position of the focus lens 80 as the target position. The position of the zoom lens 60 to make the photographing view angle constant is calculated by a predetermined formula using the stored positions of the zoom lens 60 and the focus lens 80 and the position of the focus lens 80 after being moved. When the target position is determined by this process, the CPU 50 obtains the difference between the target position and the current position of the zoom lens 60, and outputs the control signal for instructing the rate corresponding with the difference in the direction where the difference is zero, then converts the control signal into an analog signal by the D/A converter 52 so as to provide the signal to the zoom lens control circuit 54. Thereby, the zoom lens 60 moves to a position where the change of the view angle is prevented which is caused by moving the focus lens 80 by the control of the zoom controller 54.

The operation of the focus ring 28A is detected by the potentiometer of a focus controller 228. An operation amount is outputted from the focus controller 228 by the analog signal as a position control signal for instructing a position (focus position) of the focus lens 80. Then the rate control signal is converted into the digital signal by the A/D converter 44 in the lens apparatus 12 and is inputted into the CPU 50.

Figure 6:
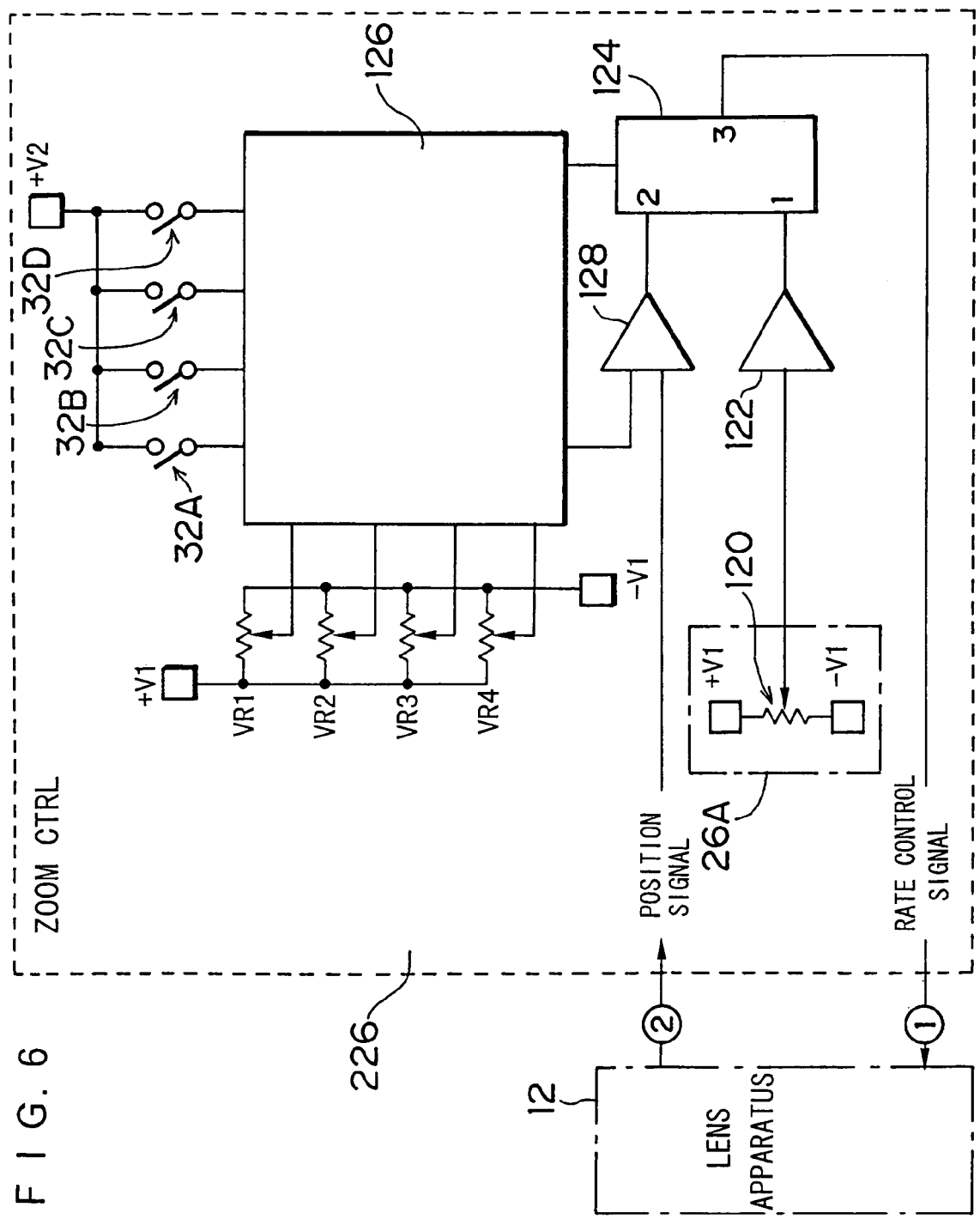
FIG. 6 is a view showing an inner construction of a zoom controller in FIG. 5.

Next, an inner structure of the zoom controller 226 is described. FIG. 6 shows the inner structure. A signal (I) in FIG. 6 is the rate control signal provided from the zoom controller 226 to the CPU 50 of the lens apparatus 12. A signal (II) is a position signal showing the current position of the zoom lens 60.

As shown in FIG. 6, the operation amount of the thumb ring 26A is converted into a voltage signal by a potentiometer 120. The voltage signal is amplified in a predetermined magnification, and is inputted to an input terminal 1 of a switching circuit 124.

The switch circuit 124 outputs a signal inputted from one of the input terminal 1 or input terminal 2 from the output terminal 3 by an instruction signal from a control circuit 126. When all of the shot switches 32A–32D provided on the switch panel 26B are turned OFF, the switch circuit 124 outputs a voltage signal which is inputted from the input terminal 1 from the output terminal 3; when one of the shot switches 32A–32D is turned ON, the voltage signal inputted from the input terminal 2 is outputted from the output terminal 3. Consequently, when all of the shot switches 32A–32D are turned OFF, the voltage signal inputted from the potentiometer 120 to the input terminal 1 via an amplifier 122 is outputted from the output terminal 3 in accordance with the operation of the thumb ring 26A. By this process, the voltage signal is transmitted to the CPU 50 of the lens apparatus 12 as the rate control signal, and thus the zoom lens 60 is driven at the rate corresponding with the operation amount of the thumb ring 26A.

When one of the shot switches 32A–32D is turned ON, the shot switch which is turned ON is detected by the control circuit 126. The control circuit 126 in this case provides an instruction signal for switching a signal which is outputted with respect to the switch circuit 124 from the output terminal 3 of the switch circuit 124 into the voltage signal which is inputted from the input terminal 2 of the switch circuit 124. When all of the shot switches 32A–32D are turned OFF, the instruction signal is provided so that the signal which is outputted with respect to the switch circuit 124 from the output terminal 3 of the switch circuit 124 is the voltage signal which is inputted from the input terminal 1.

The control circuit 126 inputs the voltage signal which is outputted from a slider element of a variable resistors VR1–VR4 corresponding with the turned-ON shot switch to one of the input terminals of a differential amplifier 128.

Positions of the sliding element of the variable resistors VR1–VR4 are changed in response to a set position of the shot position adjustment knobs 34A–34D provided to the switch panels 26B. The voltage signal outputted from the slider element of the respective variable resistors VR1–VR4 indicates the position where the zoom lens 60 should be positioned when turning the shot switches 32A–32D ON.

The differential amplifier 128 amplifies the difference between the voltage signals which are inputted from two input terminals at a predetermined magnification and outputs the amplified voltage signal from the output terminal. The voltage signal outputted from the slider elements of the variable resistors VR1–VR4 are inputted to one input terminal as described above, and the position signal provided from the lens apparatus 12 is inputted to the other input terminal. Consequently, the voltage signal corresponding with the difference between the shot position where the zoom lens 60 should be positioned and the current position of the zoom lens 60 is outputted from the differential amplifier 128, and the voltage signal is inputted to the input terminal 2 of the switch circuit 124.

The voltage signal which is inputted from the input terminal 2 of the switch circuit 124 is outputted from the output terminal 3 of the switch circuit 124 when one of the shot switches 32A–32D is turned ON as described above, and is transmitted to the CPU 50 of the lens apparatus 12 as the rate control signal. The zoom lens 60 moves in accordance with the rate control signal, and the position signal of the zoom lens 60 gradually approaches at the shot position; hence the zoom lens 60 moves to and stops at the shot position.

Releasing of the execution of the shot function may be done by pressing the turned-ON shot switch again, or by operating the thumb ring 26A.

Figure 7:
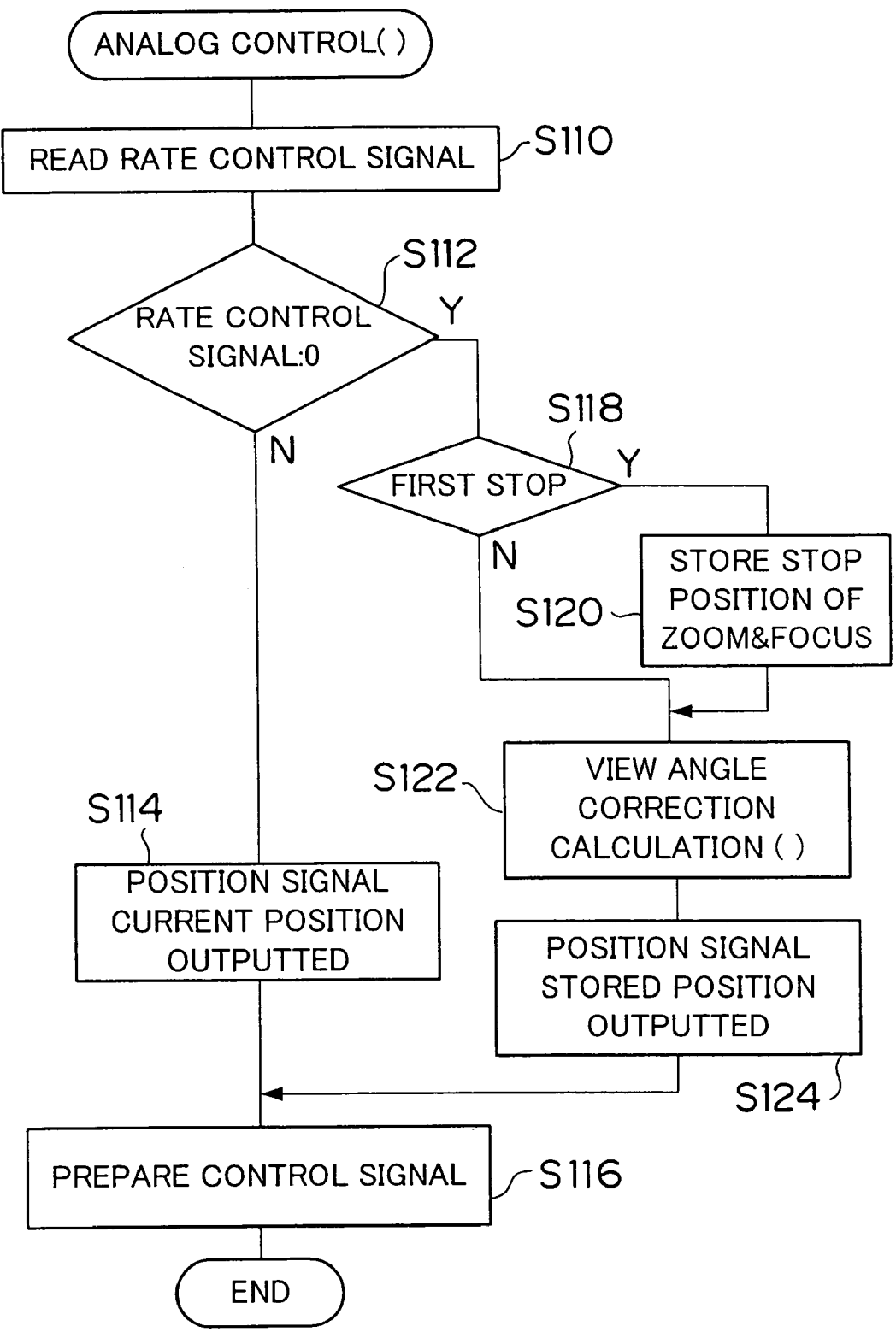
FIG. 7 is a flowchart showing a process of a CPU in the second embodiment of the present invention.

A process of the CPU 50 will be described using a flowchart in FIG. 7. In the process, the zoom lens can be moved to a position to correct the view angle by the view angle correction function of the CPU 50 of the lens apparatus 12 after moving the zoom lens 60 to the shot position by the shot function, in a case where the zoom controller 226 which is constructed as described above is connected with the lens apparatus 12.

The CPU 50 reads in the rate control signal from the zoom controller 226 (step S110), and determines whether or not the rate control signal is zero or not (step S112). If the determination is NO, the CPU 50 outputs the current position of the zoom lens 60 to the zoom controller 226 as the position signal (step S114). The CPU 50 then generates the control signal for instructing the moving rate of the zoom lens 60 in accordance with the rate control signal which is read from the zoom controller 226 as described above, and outputs the control signal to the zoom control circuit 54 (step S116).

If the determination at step S112 is YES, that is, if the rate control signal provided from the zoom controller 226 instructs stopping the zoom lens 60 (signal value zero), the CPU 50 at first determines whether or not determining the stopping instruction is the first time (step S118). When the rate control signal is determined as the stopping instruction for the first time at step S112 after instructing a temporal move rather than stopping the zoom lens 60, the stopping instruction is determined as the first time at step S118. If the determination is YES, the CPU 50 stores the stopping positions of the zoom lens 60 and the focus lens 80 (step S120). If the determination is NO, the CPU does not execute the process of step S120 because the stopping positions are already stored.

The CPU 50 next calculates view angle correction (step S120). The calculation for the view angle correction is a process in which the positions of the zoom lens 60 and the focus lens 80 which are stored at step S120 when the focus lens 80 moves and the position of the zoom lens 60 which makes the view angle constant are obtained from the predetermined formula in accordance with the position of the moved focus lens 80 in a state where the zoom lens 60 is stopping. As the next process, the CPU 50 fixes the value of the position signal of the zoom lens 60 to be outputted to the zoom controller 226 at a value which indicates the position of the zoom lens 60 stored at step S120 before moving the zoom lens 60 in accordance with the result of the view angle correction calculation, and outputs the position signal to the zoom controller 226 (step S124). In other words, when executing the position control based on the view angle correction function, the position signal indicating the current position of the zoom lens 60 which is outputted to the zoom controller 226 is fixed to the position signal indicating the stopping position of the zoom lens 60 when the rate control signal provided from the zoom controller 226 instructs stopping.

After that, the CPU 50 generates the control signal for instructing the moving speed of the zoom lens 60 in accordance with the result of the view angle correction calculation at step S122, and the control signal is outputted to the zoom control circuit 54 so as to move the zoom lens (step S116). By the process, the zoom controller 226 does not detect the moving despite that the zoom lens 60 moves by the control based on the view angle correction function. Thus for example, if the CPU 50 performs the view angle correction under the state where the zoom lens 60 is stopping at the shot position caused by that the zoom controller 226 executes the shot function, the zoom controller 226 does not output the rate control signal for returning the zoom lens 60 at the shot position; thus the view angle can be corrected even when the zoom lens 60 is stopping at the shot position by the shot function.

The position signal of the zoom lens 60 which is fixed at step S124 is released when the thumb ring 26A of the zoom controller 226 is operated, or a shot position which is different from the instructed shot position based on the shot function is instructed, and the position signal returns to the position signal which indicates the actual current position of the zoom lens 60. In short, the zoom lens 60 is controlled in accordance with the rate control signal from the zoom controller 226.

In the second embodiment as presented above, a case in which the zoom controller 226 performs the position control based on the shot function. However, the control based on the view angle correction function with respect to the zoom lens 60 which is stopping at the predetermined target position by the position control can be performed by fixing the position signal of the zoom lens 60 which is outputted to the zoom controller 226 when correcting the view angle in a manner similar with the second embodiment even in a case where the zoom controller 226 performs a position control other than the shot function.

In the second embodiment, the lens apparatus 12 and the zoom controller 226 transmit the rate control signal and the position signal in the analog form. However, the present invention can also be applied like the second embodiment even though the lens apparatus and the zoom controller exchange digital signals by the serial communication like the first embodiment.

Hereunder the third embodiment of the present invention will be described. The members which are the same or similar with the ones in the first and second embodiments are assigned the same or similar reference numbers, and the description for them is omitted.

In the position control based on the limit function which is instructed on the switch panel 26B of a zoom controller 326, when the limit switch 38A and the limit switch 38B which are provided to the switch panel 26B of the zoom controller 326 are turned ON, the limit function related to the widephoto side and the telephoto side are validated, and the limit position at the widephoto side and the telephoto side are set in accordance with the limit position adjustment knob 40A and the limit position adjustment knob 40B which are provided corresponding with the limit switches 38A and 38B, respectively. When controlling the zoom lens 60 in accordance with the operation of the thumb ring 26A or based on the shot function, the moving range of the zoom lens 60 is restricted so that the zoom lens 60 does not exceed the limit position and moves to the outside of the limit position (which is at the side closer to the widephoto side with respect to the limit position of the widephoto side, and at the side closer to the telephoto side with respect to the limit position of the telephoto side). When one of the limit switches 38A and 38B is pressed, the zoom controller 326 detects a setting position of the limit position adjustment knobs 40A and 40B corresponding with the pressed limit switch 38A or 38B, and sets the widephoto side or the telephoto side as the limit position corresponding with the pressed limit switch 38A and 38B. In a case that one of the limit switches 38A and 38B is not turned ON, or neither of the switches are turned ON, the limit position at the side which is not ON is set at the widephoto end or the telephoto end (either of the widephoto side or the telephoto side is the mechanical end).

While executing the control for moving the zoom lens 60 in accordance with the operation of the thumb ring 26A or based on the shot function or the view angle correction function, the zoom controller 326 determines the limit position in the moving direction as the target position. The zoom controller 326 then obtains the current position of the zoom lens 60 current position of the zoom lens 60 from the CPU 50 of the lens apparatus 12 via the D/A converter 42, and as the difference between the determined target position and the current position becomes smaller than the predetermined value (that is, as the position of the zoom lens 60 approaches to the predetermined distance of the limit position), the zoom controller 326 restricts the rate control signal to be provided to the CPU 50 of the lens apparatus 12 at the rate corresponding with the difference between the target position and the current position. In the similar manner as the rate control in accordance with the operation of the thumb ring 26A, the CPU 50 outputs to the zoom control circuit 54 the control signal for instructing the rotation speed of the zoom drive motor 56 (the moving rate of the zoom lens 60) based on the rate control signal, whereby the rate of the zoom lens 60 is decreased at the proximity of the limit position regardless of the operation of the thumb ring 26A and stops at the position which is not over the limit position. The zoom controller 326 executes the control for moving the zoom lens 60 to the limit position in the same manner as the position control based on the shot function when the zoom lens 60 is at the outside of the limit position.

The CPU 50 voluntarily changes a value of the position signal of the zoom lens 60 which is transmitted to the zoom controller 326 from the value indicating the current position of the zoom lens 60, and detects whether or not the zoom controller 326 executes the control in accordance with the operation of the thumb ring 26A or executing the control based on the shot function by detecting a state of changing of the rate control signal which is provided from the zoom controller 326 as a response to the changing. In other words, the CPU 50 increases or decreases the value of the position signal from the value of the current position and transmits the position value to the zoom controller 326; if the value of the rate control signal which is provided from the zoom controller 326 hardly changes in comparison between the increase and decrease of the value of the position signal, the control of the zoom controller 326 is unrelated to the position of the zoom lens 60, and the CPU determines that the control in accordance with the operation of the thumb ring 26A is being executed.

On the other hand, if the value of the rate control signal which is provided from the zoom controller 326 increases at one side and decreases at the other side between the case to increase the value of the position signal and the case to decreased the value of the position signal when the value of the position signal is increased or decreased from the value of the current position and transmitted to the zoom controller 326, the CPU 50 determines that the control of the zoom controller 326 relates to the position of the zoom lens 60, and determines that the control based on the shot function is being executed.

The control contents of the zoom controller 326 may also be discriminated when the zoom lens is stopping.

The CPU 50 determines by the above method that the zoom controller 326 executes the control based on the shot function, and sets a range of value (hereunder called an insensitive area) which is determined as instructing stopping like zero at both positive and negative sides of the zero value which instructs stopping of the rate control signal when the value of the position signal is fixed in order to correct the view angle as described above. In other words, the position signal sometimes displaces from the shot position due to varying error of the position signal even though the position signal is fixed at the shot position and the rate control signal for instructing moving is erroneously provided from the zoom controller 326. In such case, the CPU 50 cannot determine whether or not the rate control signal originates the operation of the thumb ring 26A or originates the error of the position signal. Moreover, the operation of the thumb ring 26A must be prioritized with respect to the view angle correction. Because of that, the CPU 50 must obey the rate control signal and cannot appropriately correct the view angle correction. However, by setting the insensitive area which is determined that the rate control signal instructs stopping at both of the positive and the negative sides of the zero value, the CPU 50 can perform the view angle correction without obeying the rate control signal due to the error. The range of the insensitive area to be set is determined by considering a variation width of the value of the rate control signal which is caused by the error of the position signal and so forth.

Similar with the process described above, the CPU 50 of the lens apparatus 12 voluntarily varies the value of the position signal of the zoom lens 60 to be transmitted to the zoom controller 326, and detects the limit position by detecting the state of changing of the rate control signal which is provided from the zoom controller 326 as the response to the change. More specifically, when the rate control signal which is provided from the zoom controller 326 instructs moving to the telephoto side in a state where the value of the position signal to be transmitted to the zoom controller 326 is changed to a value which indicates the position at the widephoto side rather than the current position of the zoom lens 60, the CPU 50 determines that the limit position at the widephoto side exists between the current position of the zoom lens 60 and the position which is transmitted as the position signal; on the other hand, if the rate control signal which is provided from the zoom controller 326 instructs moving to the widephoto side when changing the value of the position signal to a value which indicates the position at the telephoto side rather than the current position of the zoom lens 60, the CPU 50 determines that the limit position at the widephoto side exists between the current position of the zoom lens 60 and the position which is transmitted as the position signal. When transmitting the position signal by reducing the amount to change from the current position, the current position of the zoom lens 60 at the time of detecting the limit position in the manner described above may be determined as the limit position; by changing the value of the position signal in the direction same as the moving direction of the zoom lens 60 while the zoom lens 60 is moving and detecting the time the rate control signal instructs moving in the direction opposite to the moving direction, the position which is transmitted as the position signal at the time of the detection may be determined as the limit position. Moreover, by gradually changing the value of the position signal to the telephoto side or to the widephoto side and detecting the time the rate control signal for instructing moving in the direction opposite to the changing direction is provided, the position which is transmitted as the position signal at the time of detection can be determined as the limit position.

As the CPU 50 detects the limit position by the above-described procedure, the CPU 50 restricts the moving range of the zoom lens 60 so that the zoom lens 60 does not move to the outside of the limit position when moving the zoom lens 60 by the view angle correction. If the CPU 50 determines that the zoom lens 60 stops at the limit position, the CPU 50 sets the insensitive area as the range of value in which the rate control signal which is provided from the zoom controller 326 in the same manner as described above instructs stopping. Thereby, the same disadvantage as the one described above can be solved.

Figure 8:
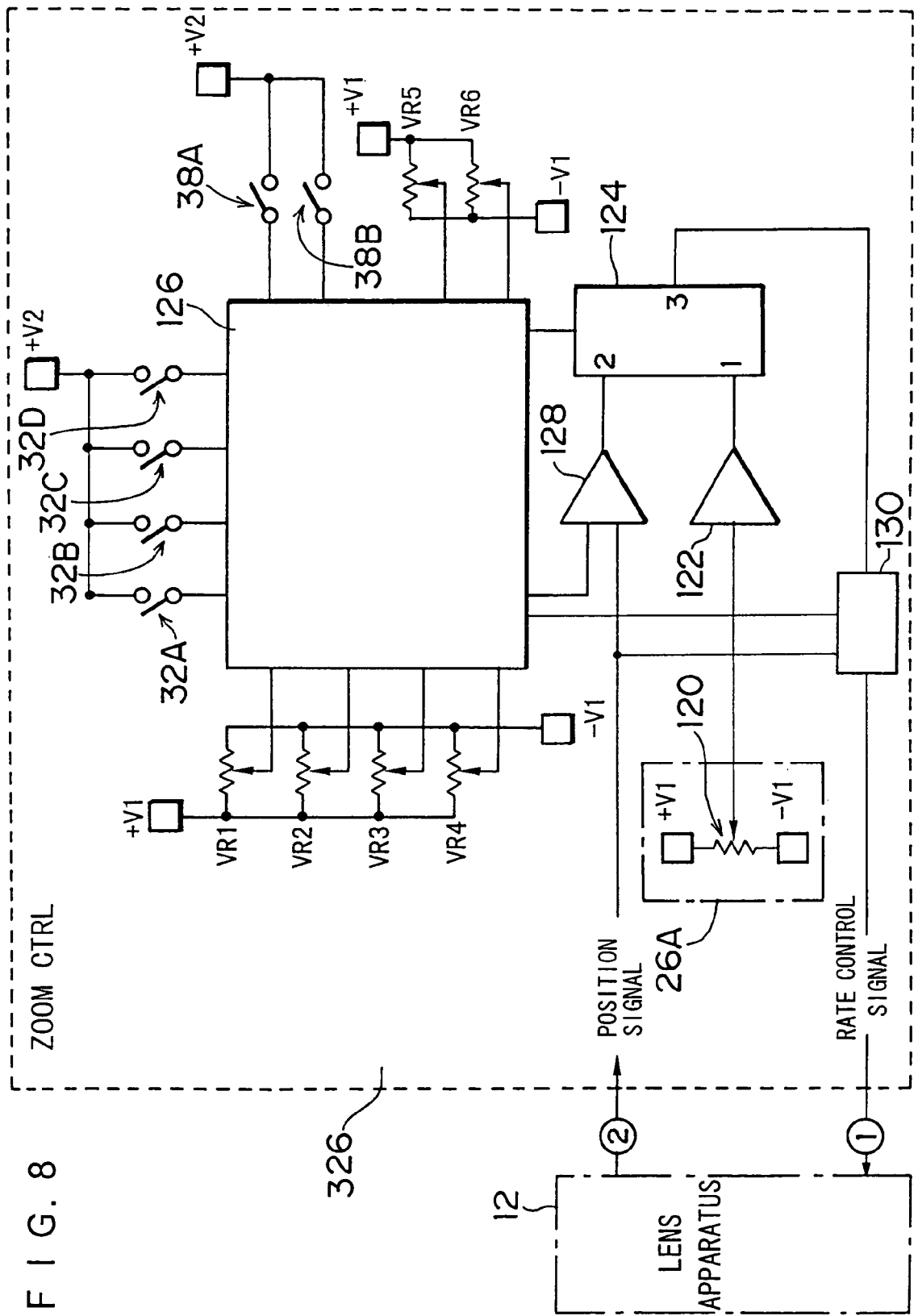
FIG. 8 is a view showing the inner construction of the zoom controller in the third embodiment of the present invention.

Next, the inner structure of the zoom controller 326 will be described. FIG. 8 shows the inner structure. As shown in FIG. 8, the operation amount of the thumb ring 26A is converted into the voltage signal by the potentiometer 120, and the voltage signal is amplified at the predetermined magnification by the amplifier 122, then is inputted to the input terminal 1 of the switch circuit 124.

The switch circuit 124 outputs the signal inputted from one of the input terminal 1 and the input terminal 2 from the output terminal 3 by the instruction signal of the control circuit 126. When all of the shot switches 32A–32D which are provided to the switch panel 26B are turned OFF, the voltage signal inputted from the input terminal 1 is outputted from the output terminal 3; when one of the shot switches 32A–32D is turned ON, the voltage signal which is inputted from the input terminal 2 is outputted from the output terminal 3. Thus, when all of the shot switches 32A–32D are turned OFF, the voltage signal which is inputted from the potentiometer 120 to the input terminal 1 is outputted from the output terminal 3 via the amplifier 122 in accordance with the operation of the thumb ring 26A. By the process, the voltage signal is transmitted to the CPU 50 of the lens apparatus 12 as the rate control signal via the limit circuit 130, and the zoom lens 60 is driven at the rate corresponding with the operation amount of the thumb ring 26A.

When one of the shot switches 32A–32D is turned ON as mentioned above, the voltage signal inputted to the input terminal 2 of the switch circuit 124 is outputted from the output terminal of the switch circuit 124, and the voltage signal is transmitted to the CPU 50 as the rate control signal via the limit circuit 130. By this process, the zoom lens 60 moves in accordance with the rate control signal and the position signal of the zoom lens 60 which is inputted to the differential amplifier 128 gradually approaches to the shot position. The zoom lens 60 in consequence moves to and stops at the shot position.

The execution of the shot function may be released by pressing the pressed shot switch again, or by operating the thumb ring 26A.

The limit circuit 130 converts the voltage signal (rate control signal) which is outputted from the output terminal 3 of the switch circuit 124 in a direction in order to reduce the rate instructed by the rate control signal when the limit switches 38A and 38B of the switch panel in FIG. 2 are turned ON. When one of the limit switches 38A and 38B is turned ON, the control circuit 126 inputs the voltage signal which is outputted from the slider element of the changeable resistance VR5 or changeable resistance VR6 which correspond with the turned-ON limit switch in the predetermined input terminal of the limit circuit 130 (the voltage signal outputted from both of the slider elements is inputted when both of the limit switches 38A and 38B are turned ON). The changeable resistance VR5 and VR6 can change positions of the slider elements in response to the set positions of the limit position adjustment knobs 40A and 40B which are provided to the switch panel 26B. The voltage signal outputted from the slider elements of the changeable resistances VR5 and VR6 indicate limit positions of the respective widephoto side and the telephoto side when the corresponding limit switches 38A or 38B is turned ON.

The position signal which is provided from the lens apparatus 12 is inputted to other input terminals of the limit circuit 130. When the difference between the limit position and the current position of the zoom lens 60 is reducing and the difference is smaller than the predetermined amount, the limit circuit 130 restricts the rate control signal which is provided from the switch circuit 124 at the voltage corresponding with the difference in accordance with the signal which indicates the limit position inputted from the input terminal and the position signal which indicates the current position of the zoom lens 60. By the process, the rate control signal is restricted by the limit circuit 130 and the zoom lens 60 stops at the limit position despite that the zoom lens 60 outputs the rate control signal which exceeds the limit position due to the operation of the thumb ring 26A or the control based on the shot function.

Figure 9:
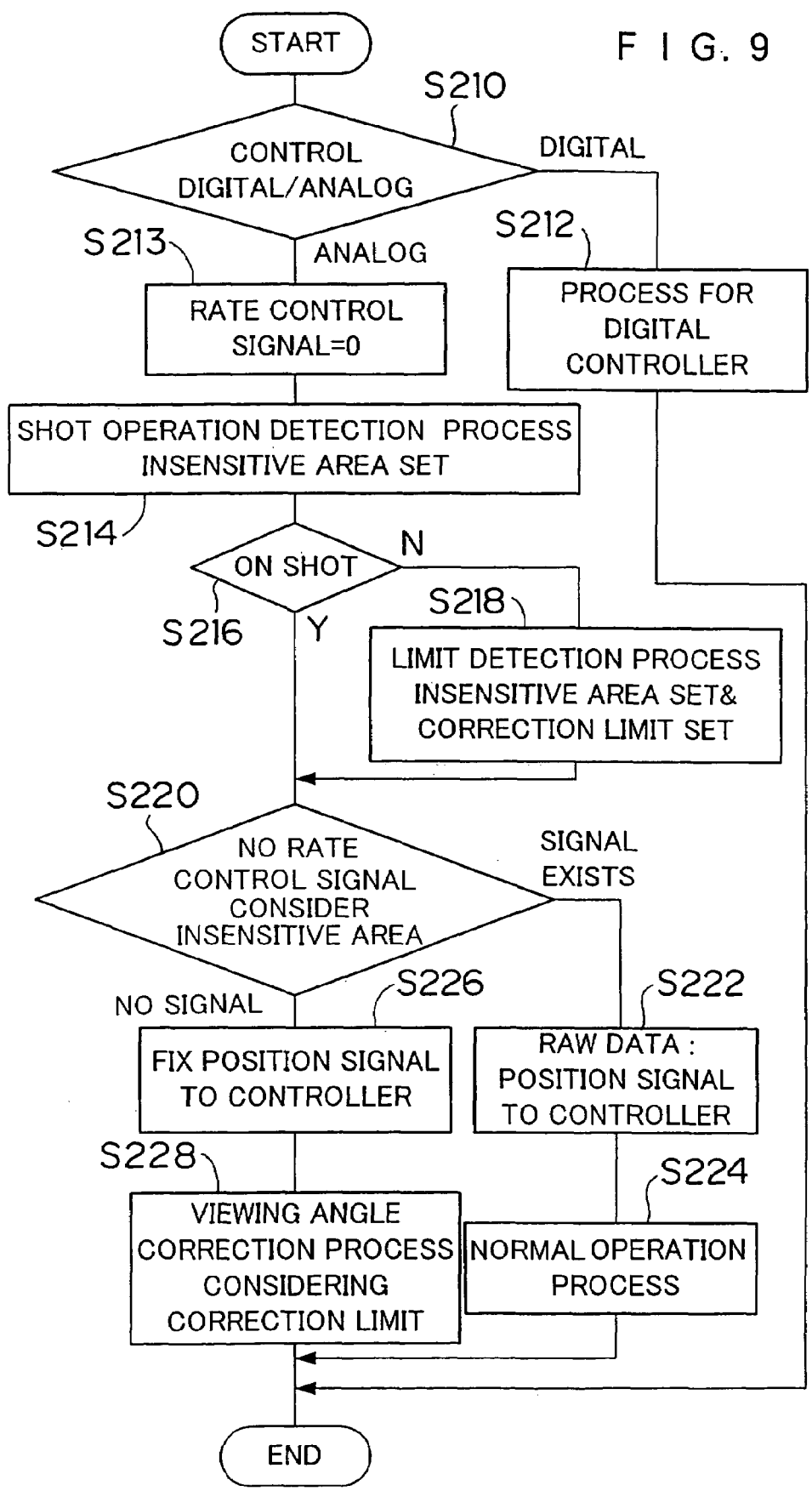
FIG. 9 is a flowchart showing a procedure related to the zoom of the third embodiment of the present invention.

A process will be described related to the control of the zoom lens 60 in the CPU 50 of the lens apparatus 12 in the third embodiment of the present invention which is constructed as described above using flowcharts in FIGS. 9–11. As shown in FIG. 9, the CPU 50 determines first whether or not the zoom controller 326 which is connected with the lens apparatus 12 is in the digital form or in the analog form (step S210). The digital zoom controller transmits respective information such as rate control signal to the CPU 50 by the serial communication. On the other hand, as shown in FIG. 5, the analog zoom controller instructs the zoom rate and so forth by the voltage value of the analog voltage signal. The CPU 50 transmits the predetermined command to the zoom controller 326, and determines that the zoom controller 326 is in the digital form if there is a response to the command from the zoom controller 326. The CPU 50 also determines that the zoom controller 326 is in the analog form if there is no response to the command from the zoom controller 326. If the determination is digital, the CPU 50 performs a process for the digital zoom controller (step S212), but the description on the process will be omitted.

If the zoom controller 326 is determined to be in the analog form, the CPU 50 controls to drive the zoom lens 60 in accordance with the rate control signal which is provided from the zoom controller 326 as described above; however for now, it is assumed that the rate control signal indicates a value (zero) which instructs stopping after some control (step S213).

At this point, the CPU 50 first detects whether or not the control based on the shot function (shot operation) is performed in the zoom controller 326, and if the shot operation is being performed, the CPU sets the insensitive area which is a range where the value of the rate control signal instructs stopping as described above (step S214). The details of the contents of the process at step S214 will be described later.

The CPU 50 then determines whether or not the shot operation is being performed by detecting the shot operation at step S214 (step S216). If the determination is NO, the CPU 50 performs the process for limit detection, and if the limit position is detected, the CPU 50 sets the insensitive area in the same manner as described above, as well as setting the correction limit (step S218). If the determination is YES at step S216, the CPU 50 does not perform the process at step S218. The details of the contents of the process at step S218 will be described later.

The CPU 50 now determines whether or not there is a rate control signal from the zoom controller 326 (step S220). In this case, it is determined that there is no rate control signal if the rate control signal from the zoom controller 326 instructs it to stop. At this point, the CPU 50 determines by considering the insensitive area; more specifically, if the value of the rate control signal provided from the zoom controller 326 is in a range which is set as the insensitive area at step S214 or S218, it is determined that there is no rate control signal (zero). If the determination is YES, that is, if there is the rate control signal, the CPU 50 transmits the current position of the zoom lens 60 to the zoom controller 326 as the position signal (step S222), and executes a normal process related to the control of the zoom lens 60 in accordance with the rate control signal provided from the zoom controller 326 (step S224).

On the other hand, if the determination is NO at step S220, that is, if there is no rate control signal, the CPU 50 fixes the position signal to be transmitted to the zoom controller 326 at a value of the stopping position (step S226), and executes the process related to the control of the view angle correction (step S228). The CPU 50 at this point considers the correction limit; more specifically, if the limit position is detected at step S218, the CPU 50 corrects the view angle in a range where the zoom lens 60 does not exceed the limit position.

The CPU 50 repeatedly executes the process through steps S213 to S228.

Figure 10:
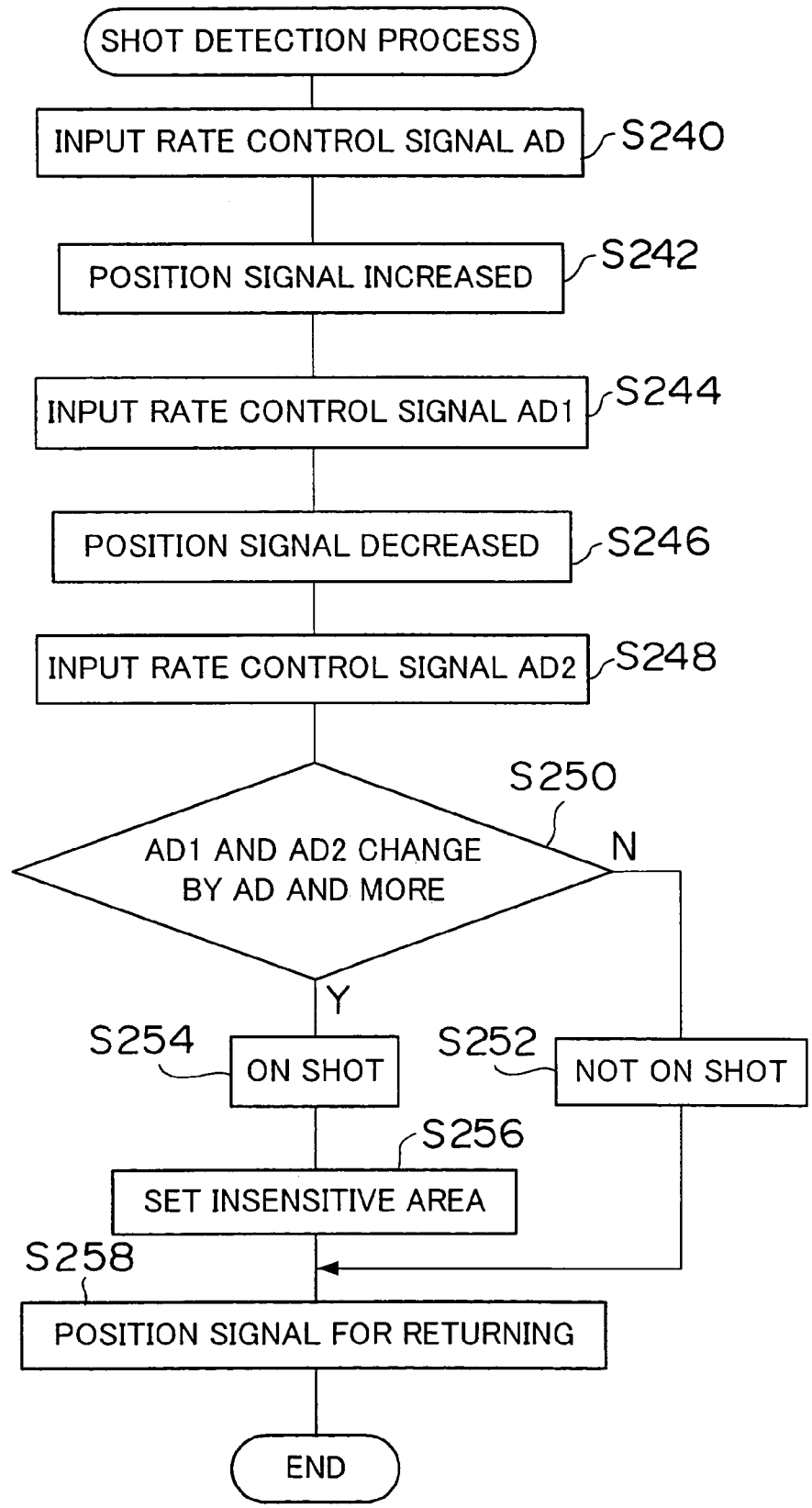
FIG. 10 is a flowchart showing a procedure of shot operation detection of the third embodiment of the present invention.

Now, a process for shot detection at step S214 will be described. As shown in FIG. 10, the CPU 50 sets the rate control signal provided from the zoom controller 326 as an AD (step S240). Because the detection process for the shot operation is executed when the rate control signal is zero as shown at step S213, the value of AD is zero; however, the detection process for the shot operation can also be performed when the zoom lens 60 is moving (when the rate control signal is not zero). Thus, from now on the value of AD is not limited to be zero.

Continuously, the CPU 50 transmits the value to the zoom controller 326 (step S242). The value is transmitted as the position signal which indicates a position where the zoom lens 60 is displaced by a predetermined amount in a predetermined direction (e.g. the telephoto side) with respect to the current position of the zoom lens 60. In short, the value of the position signal is increased from the value which indicates the current position of the zoom lens 60. At this point, the value of the rate control signal provided from the zoom controller 326 is determined as AD1 (step S244). The CPU 50 then transmits the value to the zoom controller 326 (step S246). This time the value is transmitted as the position signal which indicates the position where the zoom lens 60 is displaced by the predetermined amount in the direction (e.g. the widephoto side) opposite to the predetermined direction with respect to the current position of the zoom lens 60. In short, the value of the position signal is decreased from the value which indicates the current position of the zoom lens 60. The value of the rate control signal provided from the zoom controller 326 at this time is determined as AD2 (step S248).

The CPU 50 determines whether or not the values of AD1 and AD2 change by the predetermined value or more with respect to the values of AD mentioned above (step S250). If the determination is NO, the CPU 50 determines that the shot operation is not performed (step S252). If the determination is YES, the CPU 50 determines that the shot operation is being performed (step S254), and sets the insensitive area (step S256). After the above-described process is completed, the CPU 50 returns the position signal to be transmitted to the zoom controller 326 at the value which indicates the current position of the zoom lens 60, and ends the shot detection process.

Figure 11:
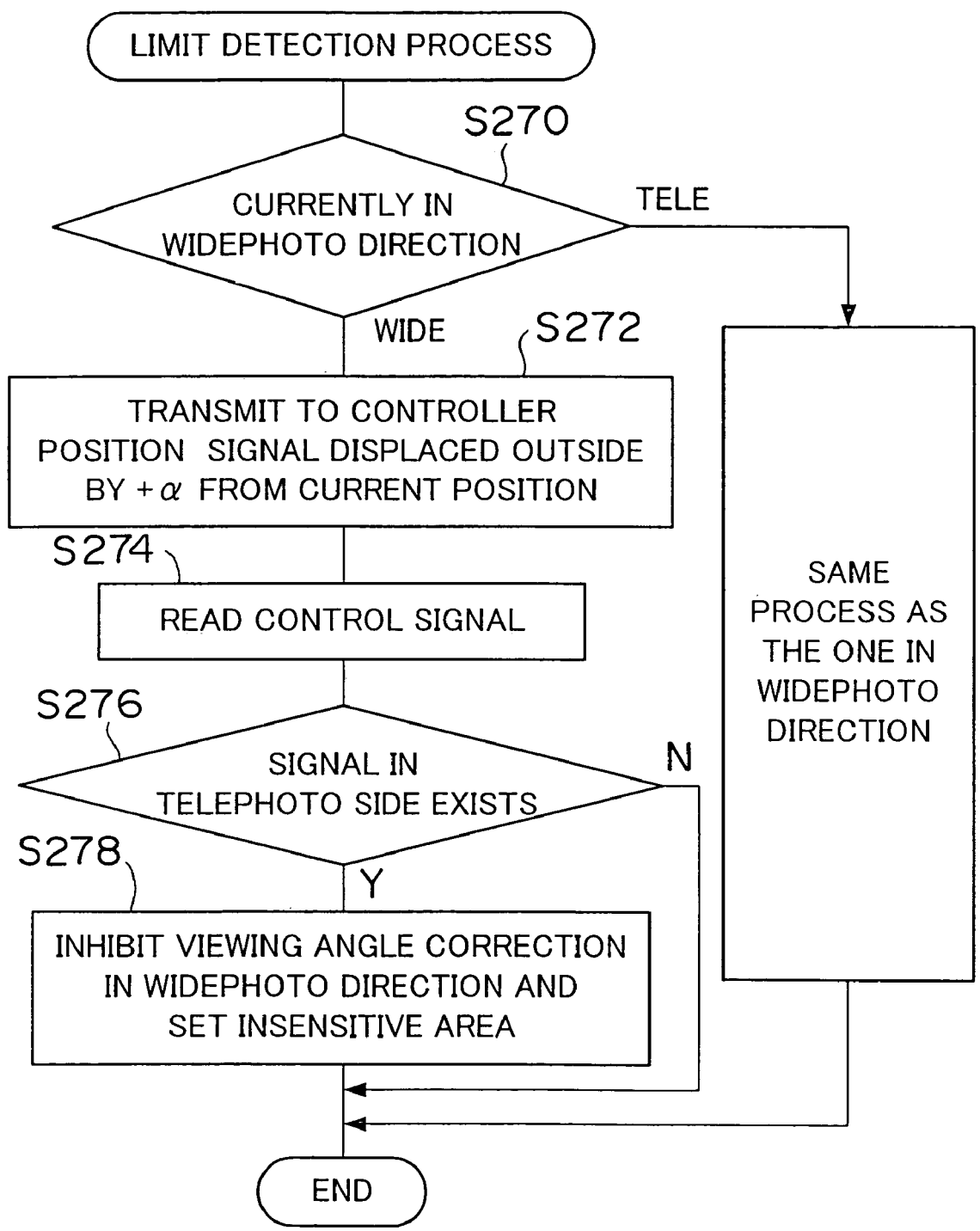
FIG. 11 is a flowchart showing a procedure of limit detection of the third embodiment of the present invention.

Now, a process for the limit detection at step S218 will be described. As shown in FIG. 11, the CPU 50 determines whether or not the rate control signal provided from the zoom controller 326 instructs moving in the widephoto direction or moving in the telephoto direction (step S270). As described with regard to step S213, because the limit detection process is executed when the rate control signal is zero, it is impossible to decide in what direction the rate control signal instructs to move to the time of determination of step S270 alone. However, the limit detection process shows the process including the case since the limit detection process can be performed while the zoom lens 60 is moving, like the shot operation detection process. Thus, in a case where the zoom lens 60 is stopping, the determination of step S270 may be performed in the direction the zoom lens 60 was moving at that time. Alternatively, a process presented hereunder may be performed with respect to the widephoto and telephoto directions.

Describing only a process at step S270 in a case where the rate control signal is determined as instructing moving to the widephoto direction, the CPU 50 transmits a value to the zoom controller 326 as the position signal (step S272). The position signal indicates the position where the current position of the zoom controller 326 is displaced to the outside (widephoto side) by the predetermined amount a at the widephoto side. The CPU 50 then reads the rate control signal from the zoom controller 326 (step S274), and determines whether or not the rate control signal instructs moving to the telephoto side (step S276). If the determination is YES, the CPU 50 prohibits the view angle correction to the widephoto side (setting the correction limit) because there is a limit position at the widephoto side between the current position of the zoom lens 60 and the widephoto side by the predetermined amount α. The CPU 50 at this point also sets the insensitive area which is the range where the value of the rate control signal instructs stopping as mentioned above (step S278). If the determination at Step S276 is NO, the process at step S278 is not performed. Also in a case where the CPU 50 determines the telephoto direction at step S270, the same process through steps S272–S278 is performed.

According to the process shown by the flowcharts in FIGS. 9–11 as described above, the view angle can be corrected with respect to the zoom lens 60 which is stopping at the shot position by the control based on the shot function while the view angle is prevented from being corrected over the limit position.

In the third embodiment as presented above, the CPU 50 fixes the position signal to be outputted to the zoom controller 326 when performing the view angle correction, whereby the rate control signal is prevented from being provided which instructs moving from the zoom controller 326 caused by the moving of the zoom lens 60 and by the shot function or the limit function in the zoom controller 326. However, the present invention is not limited only to fixing the position signal. Instead of fixing the position signal, the CPU 50 does not have to accord with the rate control signal provided from the zoom controller 326 when correcting the view angle. However, the CPU 50 basically has to accord with the rate control signal provided by the operation of the thumb ring 26A, thus the CPU 50 start controlling the zoom lens 60 in accordance with the rate control signal in a case where a rate control signal which is unrelated to moving of the zoom lens 60 by the view angle correction, for example, if the value of the rate signal suddenly changes.

In the third embodiment, the lens apparatus 12 and the zoom controller 326 transmit the rate control signal and the position signal with the analog signal; however, the present invention can also be applied in the same manner as described in the third embodiment even in a case where the lens apparatus and the zoom controller exchanges the signals with the digital signal by the serial communication like the first embodiment.

As described hereinabove, according to the lens system of the present invention, the control which is originally provided to the lens apparatus or the control which is installed in the controller is executed by a single control part; thus, a control suitable to the situation can be prioritized to be executed when plural controls are instructed at the same time. In particular, if the zoom lens is moved to the shot position by the control based on the shot function in the conventional control of the zoom lens, the zoom lens stops at the shot position and the view angle cannot be corrected. Such problem in the conventional art is easily solved by the present invention.

Moreover, the control is the same as the one in the conventional art in a case where the view angle correction is not performed when the zoom lens is at the shot position or the limit position after the zoom lens is moved to the shot position by the control based on the shot function or after the zoom lens is stopped at the limit position by the control based on the limit function. However, unlike the conventional art, the lens system of the present invention does not perform the control based on the shot function or the limit function and the control based on the view angle correction function. The lens system of the present invention does not execute the control based on the view angle correction function while executing the control based on the shot function or the limit function; thus, the problem is solved in which the zoom lens does not move well at proximity of the shot position and the limit position.

According to the lens apparatus of the present invention, the state never happens where the control signal (the control signal for instructing returning at the target position) is provided from the controller to the lens apparatus for instructing moving of the zoom lens caused by moving of the zoom lens by the view angle correction function even in a case where the lens apparatus executes the control based on the view angle correction function with respect to the zoom lens which is stopping at the predetermined target position by the position control of the controller, because the value of the control signal of the zoom lens which is provided from the lens apparatus to the controller is fixed at the value which indicates the target position. Therefore, the control part of the lens apparatus can perform the view angle correction even though the zoom lens is stopping at the target position by the position control of the controller.

When performing the view angle correction, the lens apparatus of the present invention obtains the limit position and performs the view angle correction by considering the limit position if the limit function is validated in the controller at the time of view angle correction; thus, a disadvantage is prevented in which the zoom lens moves to the outside of the limit position even though the lens apparatus prioritizes the view angle correction with respect to the control signal from the controller and performs the view angle correction.

The lens apparatus of the present invention can perform the view angle correction with respect also to the zoom lens which is stopping at the shot position by the control of the shot function because the value of the position signal to be outputted from the lens apparatus is fixed when executing the view angle correction. Further, by fixing the value of the position signal, the zoom lens might move over the limit position by the view angle correction; however the present invention can prevent a disadvantage in that the zoom lens moves to the outside of the limit position by detecting the limit position by the predetermined means and controlling the zoom lens to prevent moving from exceeding the limit position.

Furthermore, when executing the control based on the view angle correction function with respect to the zoom lens which is stopping at the shot position or the limit position by the shot function or the limit function, the position signal is fixed and the shot function or the limit function is in the state where they are invalidated; therefore, the disadvantage of the conventional art in which the shot function or the limit function and the view angle correction function are performed at the same time is solved, and the zoom lens is moved effectively at the proximity of both the shot position and the limit position.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens system, comprising:
   a lens apparatus including a movable lens and a motor, one of a position and a moving rate of the movable lens being controlled with the motor;
   a controller connected with the lens apparatus; and
   a control part mounted in one of the lens apparatus and the controller,
   wherein the lens system executes a control of the movable lens based on one of a control function provided in the lens apparatus and a control function provided in the controller,
   wherein the control part obtains contents of a control of the movable lens based on the one of the control functions, and the control part executes the control of the movable lens based on the obtained contents of the control,
   wherein the control function provided in the lens apparatus includes a view angle correction function which is an operation of moving a zoom lens to prevent a change of a view angle due to moving of a focus lens,
   wherein the control function provided in the controller includes at least one of a shot function and a limit function,
   wherein the shot function is an operation of controlling the zoom from a current zoom setting to a preset zoom setting,
   wherein the limit function is an operation of controlling zoom to restrict the zoom settings to a preset range,
   wherein the preset range is less than a maximum range of the zoom settings,
   wherein the control of the movable lens includes a control of a zoom lens,
   wherein when the zoom lens moves to and stops at a shot position by the control based on the shot function, the control part validates the control based on the view angle correction function, and
   wherein when the controls to be executed in the control part are overlapped at the same time, the control part selects one of the controls to execute in accordance with a predetermined selection process.

2. A lens system, comprising:
   a lens apparatus including a movable lens and a motor, one of a position and a moving rate of the movable lens being controlled with the motor;
   a controller connected with the lens apparatus; and
   a control part mounted in one of the lens apparatus and the controller,
   wherein the lens system executes a control of the movable lens based on one of a control function provided in the lens apparatus and a control function provided in the controller,
   wherein the control part obtains contents of a control of the movable lens based on the one of the control functions, and the control part executes the control of the movable lens based on the obtained contents of the control,
   wherein the control function provided in the lens apparatus includes a view angle correction function which is an operation of moving a zoom lens to prevent a change of a view angle due to moving of a focus lens,
   wherein the control function provided in the controller includes at least one of a shot function and a limit function,
   wherein the shot function is an operation of controlling the zoom from a current zoom setting to a preset zoom setting
   wherein the preset range is less than a maximum range of the zoom settings,
   wherein the limit function is an operation of controlling zoom to restrict the zoom settings to a preset range, and
   wherein the control part executes the control based on the limit function prior to the view angle correction function in a case where the zoom lens moves to an outside of a limit position based on the limit function by executing the control based on the view angle correction function.

3. A lens apparatus, comprising:
   a focus lens;
   a zoom lens;
   a controller; and
   a control part which executes a control for moving the zoom lens based on a control signal provided from the controller and executes a control based on a view angle correction function for moving the zoom lens to a position to prevent changing of a view angle due to moving of the focus lens,
   wherein the controller obtains, from the control part, a position signal representing a position of the zoom lens,
   wherein the control part obtains, from the controller, a control signal for moving the zoom lens to a target position set by the controller according to the position signal, wherein the target position is set when executing a shot function, wherein the shot function is an operation of controlling the zoom from a current zoom setting to a preset zoom setting, and wherein the control part comprises a position signal fixing device which fixes, when executing the control based on the view angle correction function, a value of the position signal outputted from the control part to the controller to a value representing a position of the zoom lens before executing the control based on the view angle correction function.

4. The lens apparatus as defined in claim 3, wherein the position of the zoom lens before executing the control based on the view angle correction function is a position where the zoom lens is stopped by the control based on the control signal provided from the controller.

5. A lens apparatus, comprising:
a focus lens;
a zoom lens;
a controller; and
a control part which executes a control for moving the zoom lens based on a control signal provided from the controller and executes a control based on a view angle correction function for moving the zoom lens to a position to prevent changing of a view angle due to moving of the focus lens, wherein the controller has a limit function for obtaining, from the control part, a position signal representing a position of the zoom lens and for restricting a moving range of the zoom lens so that the zoom lens does not move to an outside of a predetermined limit position based on the position signal, and wherein the predetermined limit position is within a range of movement of the zoom lens that is less than a maximum range of movement of the zoom lens, wherein the control part comprises:
a limit position determining device which determines the limit position by changing a value of the position signal being outputted from the control part to the controller from a value representing an actual position of the zoom lens and detecting a change of the control signal outputted from the controller with respect to the changed value of the position signal; and a restricting device which restricts a moving range of the zoom lens so that the zoom lens does not move to an outside of the limit position determined by the limit position determining device.

6. A lens apparatus, comprising:
a focus lens;
a zoom lens;
a controller; and
a control part which executes a control for moving the zoom lens based on a control signal provided from the controller and executes a control based on a view angle correction function for moving the zoom lens to a position to prevent changing of a view angle due to moving of the focus lens, wherein the controller has a limit function for obtaining, from the control part, a position signal representing a position of the zoom lens and for restricting a moving range of the zoom lens so that the zoom lens does not move to an outside of a predetermined limit position based on the position signal, and the controller has a shot function for stopping the zoom lens at a predetermined shot position based on the position signal, and wherein the predetermined limit position is within a range of movement of the zoom lens that is less than a maximum range of movement of the zoom lens, wherein the control part comprises:
a position signal fixing device which fixes, when executing the control based on the view angle correction function by the control part, a value of the position signal outputted from the control part to the controller to a value representing a position of the zoom lens before executing the control based on the view angle correction function;

a limit position determining device which determines the limit position by changing a value of the position signal being outputted from the control part to the controller from a value representing an actual position of the zoom lens and detecting a change of the control signal outputted from the controller with respect to the changed value of the position signal; and a restricting device which restricts a moving range of the zoom lens so that the zoom lens does not move to an outside of the limit position determined by the limit position determining device.

7. The lens apparatus as defined in claim 6, wherein when the control signal provided from the controller changes by at least a predetermined value in a case where the position signal fixing device fixes the position signal, the control part executes a control for moving the zoom lens based on the control signal and the position signal fixing device returns the position signal to a value indicating an actual position of the zoom lens.

8. A lens control system, comprising:
a zoom lens; and
a controller configured to control a movement of the zoom lens according to a priority of performing a view angle correction function and at least one of a limit function and a shot function, wherein the view angle correction function is an operation of moving the zoom lens to prevent a change of a view angle due to moving of a focus lens, wherein the shot function is an operation of controlling the movement of the zoom lens from a current position to a preset position, wherein the limit function is an operation of restricting the movement of the zoom lens to a preset range, wherein the preset range is less than a maximum range of movement of the zoom lens, wherein the controller is configured to perform the shot function prior to performing the view angle correction function when the shot function is activated, and wherein the view angle correction function is performed based on the image of the object after performing the shot function.

9. The lens control system of claim 8, further comprising:
a zoom lens movement rate limit setting device configured to set a zoom lens movement rate limit, wherein the controller is configured to control a zoom lens movement rate based on a difference between the preset position and the current position, wherein the controller is configured to control the zoom lens movement rate also based on the zoom lens movement rate limit, and wherein the zoom lens moving rate of the zoom lens decreases at a proximity of a limit position.

10. The lens control system of claim 8, wherein the controller is configured to restrict the movement of the zoom lens to the preset range when performing the view angle correction function when the limit function is activated.

11. A method to control a lens control system, comprising:
controlling a movement of a zoom lens according to a priority of performing a view angle correction function and at least one of a limit function and a shot function;
determining whether the shot function is activated;
performing the shot function when the shot function is activated; and
performing the view angle correction function based on the image of the object after performing the shot function,
wherein the view angle correction function is an operation of moving the zoom lens to prevent a change of a view angle due to moving of a focus lens,
wherein the shot function is an operation of controlling the movement of the zoom lens from a current position to a preset position, and
wherein the limit function is an operation of restricting the movement of the zoom lens to a preset range, and wherein the preset range is less than a maximum range of movement of the zoom lens.

12. The method of claim 11, further comprising:
controlling a zoom lens movement rate based on a difference between the preset position and the current position;
determining a zoom lens movement rate limit; and
controlling the zoom lens movement rate also based on the zoom lens movement rate limit,
wherein the zoom lens movement rate decreases at a proximity of a limit position.

13. The method of claim 11, further comprising:
determining whether the limit function is activated; and
restricting the movement of the zoom lens to the preset range when performing the view angle correction function when the limit function is activated.

* * * * *